(12) United States Patent
Keplinger et al.

(10) Patent No.: US 12,297,851 B2
(45) Date of Patent: May 13, 2025

(54) HIGH STRAIN PEANO HYDRAULICALLY AMPLIFIED SELF-HEALING ELECTROSTATIC (HASEL) TRANSDUCERS

(71) Applicant: The Regents of the University of Colorado, a body corporate, Denver, CO (US)

(72) Inventors: Christoph Matthias Keplinger, Gerlingen (DE); Xingrui Wang, Boulder, CO (US); Shane Karl Mitchell, Boulder, CO (US)

(73) Assignee: The Regents of the University of Colorado, a body corporate, Denver, CO (US)

(*) Notice: Subject to any disclaimer, the term of this patent is extended or adjusted under 35 U.S.C. 154(b) by 0 days.

(21) Appl. No.: 18/138,621

(22) Filed: Apr. 24, 2023

(65) Prior Publication Data

US 2023/0258203 A1  Aug. 17, 2023

Related U.S. Application Data

(63) Continuation of application No. 17/117,418, filed on Dec. 10, 2020, now Pat. No. 11,635,094.

(60) Provisional application No. 62/946,317, filed on Dec. 10, 2019.

(51) Int. Cl.
| | |
|---|---|
| F15B 15/10 | (2006.01) |
| B25J 9/10 | (2006.01) |
| F15B 5/00 | (2006.01) |
| F15B 21/06 | (2006.01) |

(52) U.S. Cl.
CPC ............ *F15B 5/006* (2013.01); *B25J 9/1075* (2013.01); *F15B 15/103* (2013.01); *F15B 21/065* (2013.01)

(58) Field of Classification Search
CPC ...... F15B 5/006; F15B 15/103; F15B 21/065; F15B 2211/885; B25J 9/1075
See application file for complete search history.

(56) References Cited

FOREIGN PATENT DOCUMENTS

WO    WO-2018175741 A1 *  9/2018  ............. F15B 15/08

* cited by examiner

*Primary Examiner* — Abiy Teka
*Assistant Examiner* — Daniel S Collins
(74) *Attorney, Agent, or Firm* — NOD Law PC

(57) ABSTRACT

High strain hydraulically amplified self-healing electrostatic transducers having increased maximum theoretical and practical strains are disclosed. In particular, the actuators include electrode configurations having a zipping front created by the attraction of the electrodes that is configured orthogonally to a strain axis along which the actuators. This configuration produces increased strains. In turn, various form factors for the actuator configuration are presented including an artificial circular muscle and a strain amplifying pulley system. Other actuator configurations are contemplated that include independent and opposed electrode pairs to create cyclic activation, hybrid electrode configurations, and use of strain limiting layers for controlled deflection of the actuator.

7 Claims, 16 Drawing Sheets

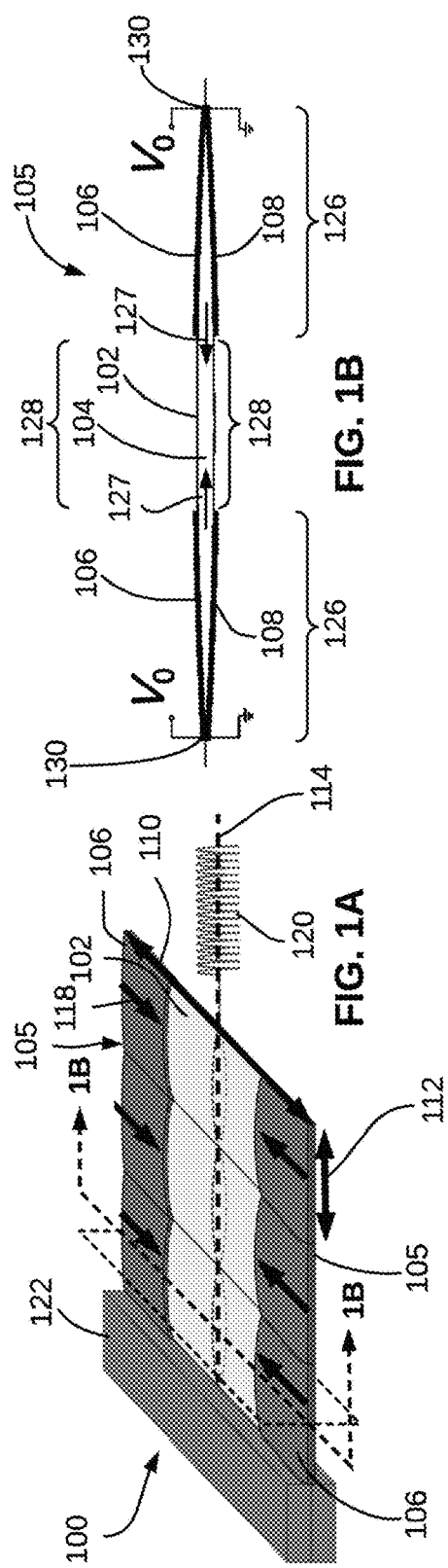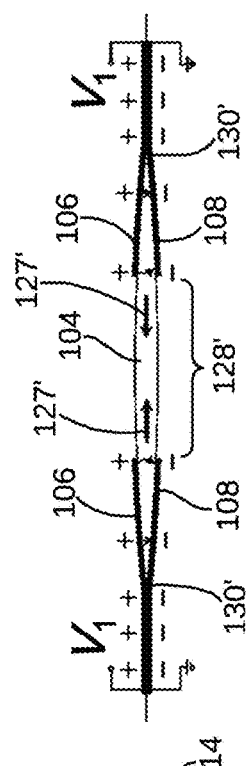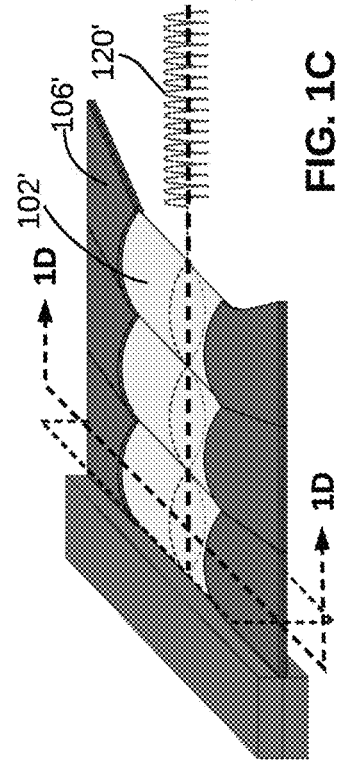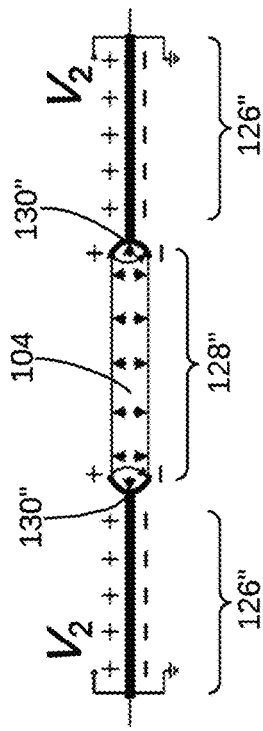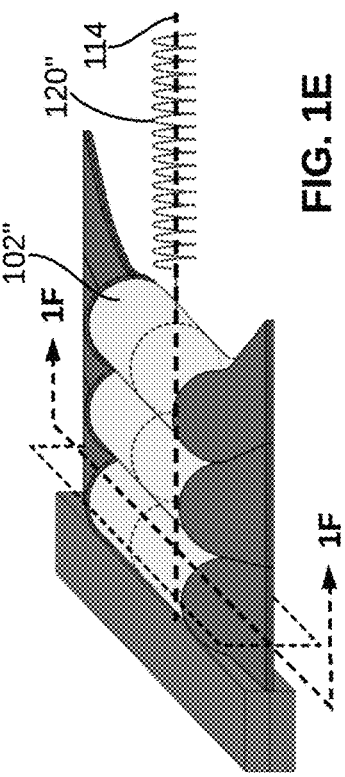

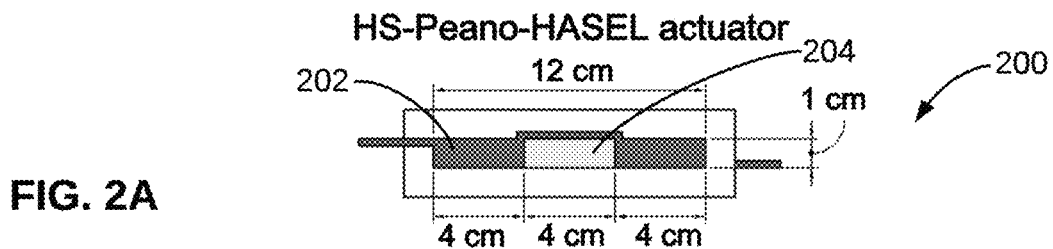
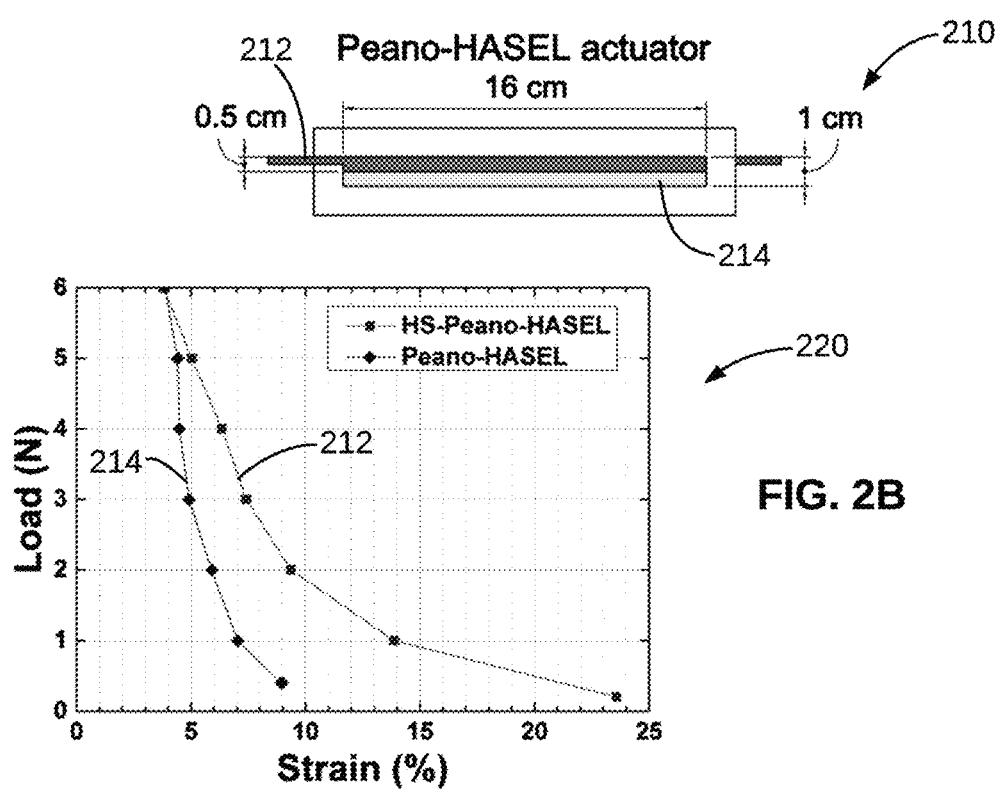
FIG. 2A
FIG. 2B
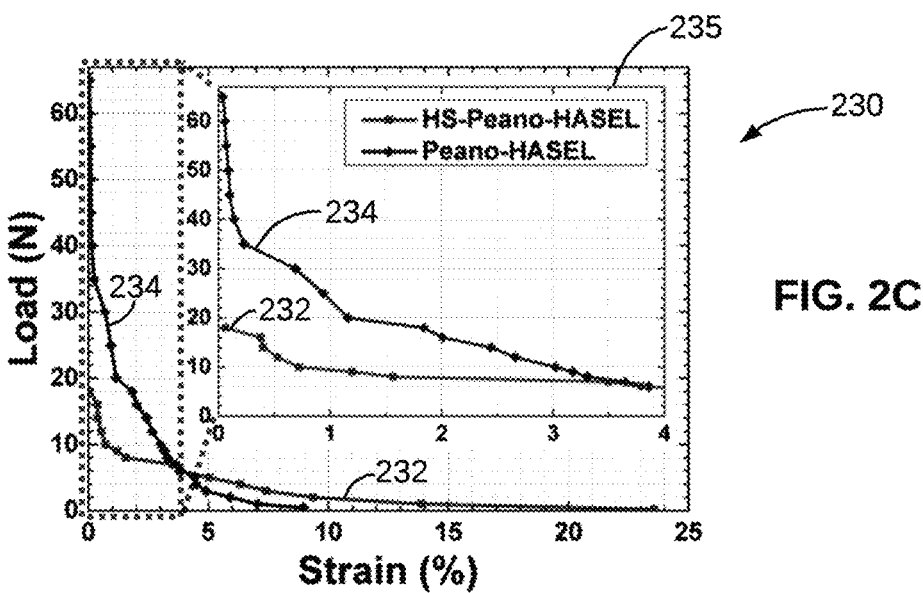
FIG. 2C

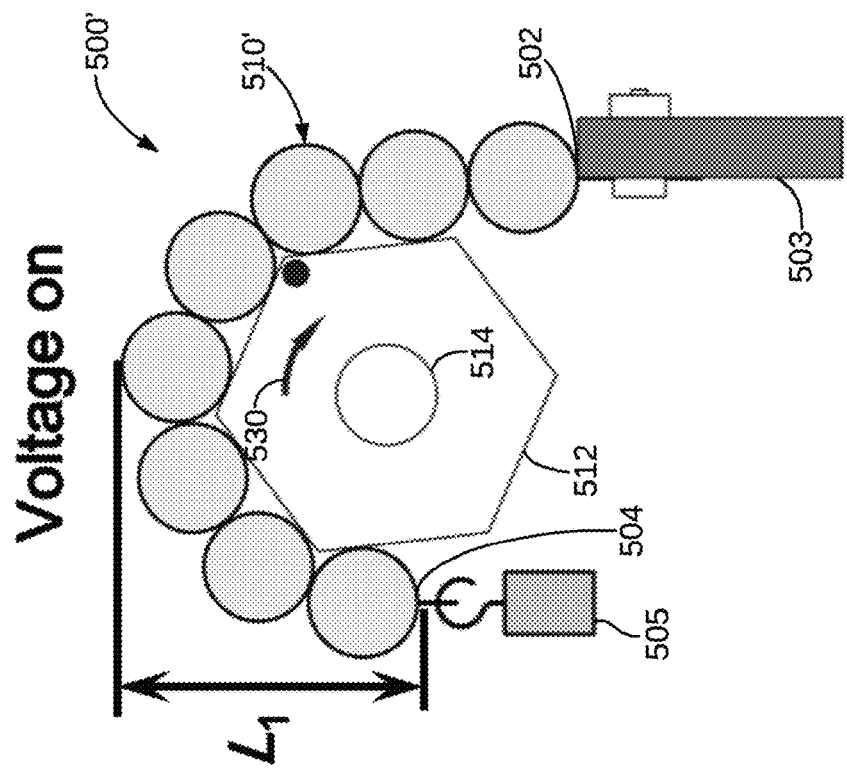
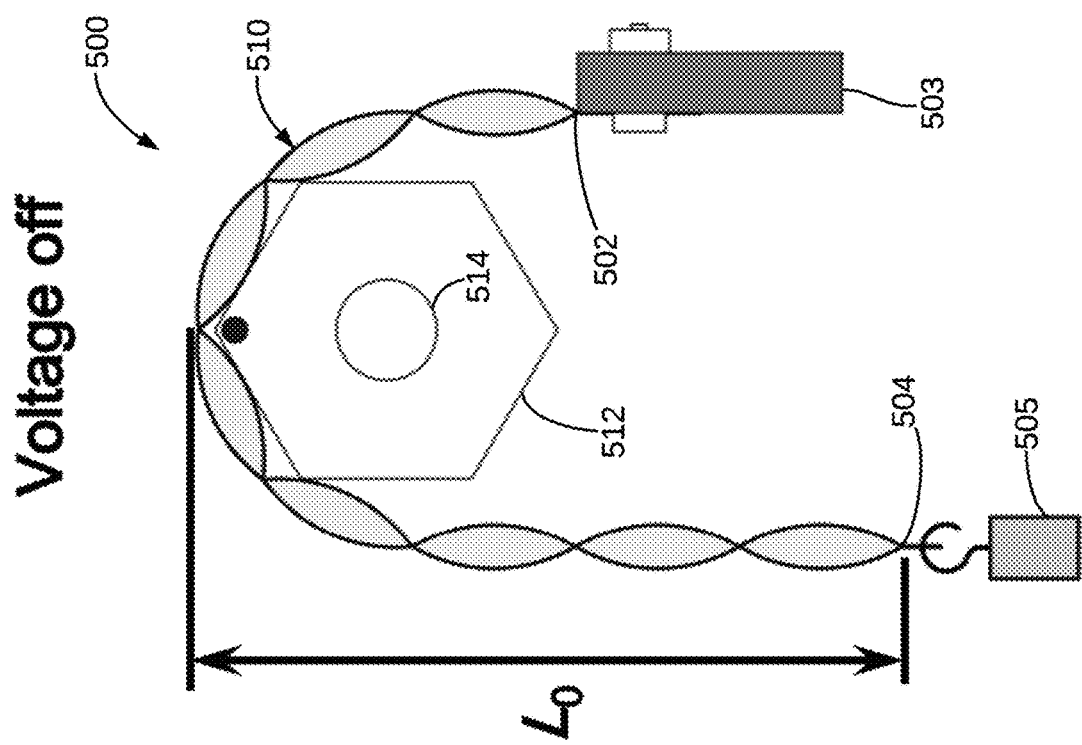
FIG. 5B
FIG. 5A

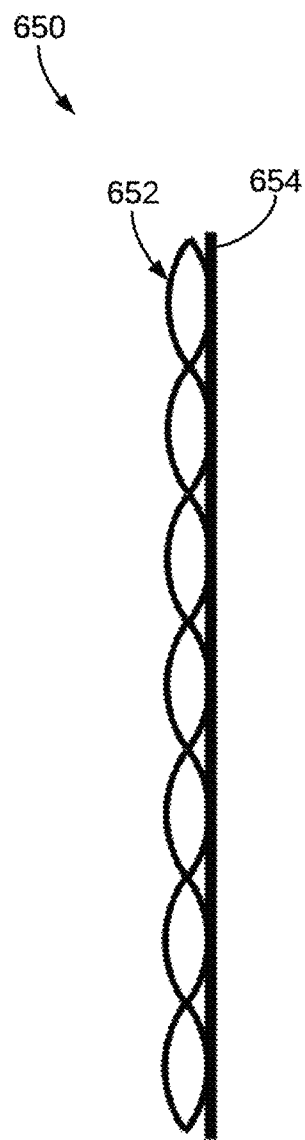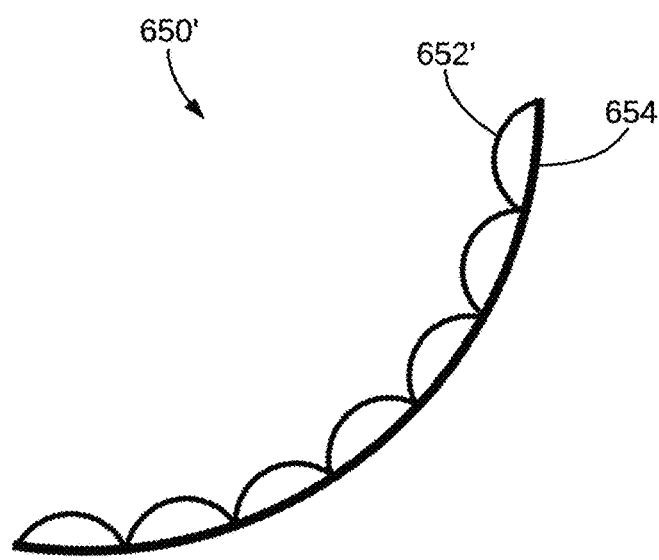
FIG. 6H
FIG. 6I

HIGH STRAIN PEANO HYDRAULICALLY AMPLIFIED SELF-HEALING ELECTROSTATIC (HASEL) TRANSDUCERS

REFERENCE TO RELATED APPLICATIONS

This application is a continuation of U.S. patent application Ser. No. 17/117,418, filed on 2020 Dec. 10 and titled "High Strain Peano Hydraulically Amplified Self-Healing Electrostatic (HASEL) Transducers," which claims priority from U.S. Provisional Patent Application No. 62/946,317 entitled "High Strain Peano Hydraulically Amplified Self-Healing Electrostatic (HASEL) Transducers," filed on 2019 Dec. 10. This application generally relates to PCT Publication No. WO2018/17541 entitled "Hydraulically Amplified Self-Healing Electrostatic Transducers," filed on 2018 Mar. 22. This application also generally relates to PCT Application No. PCT/US2019/020568 entitled "Hydraulically Amplified Self-Healing Electrostatic Transducers Harnessing Zipping Mechanism," filed on 2019 Mar. 4. All of the above patent references are incorporated herein by reference in their entirety.

SPONSORED RESEARCH AND DEVELOPMENT

This invention was made with government support under grant number 1830924 awarded by the National Science Foundation, grant number W911NF-18-1-0203 awarded by the U.S. Army Research Office, and grant number 80NSSC18K0962 awarded by NASA. The government has certain rights in the invention.

FIELD OF THE INVENTION

The present invention is directed to soft actuators and, more particularly, to muscle-mimetic actuators for use in robotics and the like.

DESCRIPTION OF RELATED ART

Historically, human-made machines have tended to rely on rigid components (e.g., such as metals) and typically have finite degrees of freedom. In contrast, nature makes extensive use of soft materials (e.g., mammalian muscle, cephalopods, muscular hydrostats, etc.) that are capable of large deformation and can easily conform to their environment. Soft robotics is a rapidly growing field with many potential applications including collaborative robots that safely interact with humans, transducers for biomedical applications, and soft grippers capable of handling delicate and irregular objects. Actuators and sensors that closely mimic properties of natural muscles are key components that will enable the next generation of soft robotic devices.

Existing artificial muscle transducers include pneumatic actuators, electroactive polymers (EAPs), shape memory polymers, and other thermally-activated systems, and each has various limitations. Currently, soft robots predominantly rely on pneumatic or fluidic actuators, which limit speed and efficiency. Such actuators are versatile and prevalent, but they have specific challenges. For example, because they are connected to storage systems of pressurized fluids or pumps via channels and valves, they tend to experience fluid drag, which can limit bandwidth and efficiency. Further, pneumatic actuators can experience significant trade-offs between actuation speed and portability, with the response speed of untethered devices being low, and such actuators can often rely on additional sensors to control parameters of actuation.

Dielectric elastomer actuators (DEAs), a specific type of EAP, exhibit performance metrics that resemble biological muscle. DEAs are hyperelastic capacitors that consist of elastomeric layers sandwiched between compliant electrodes. When voltage is applied across the two electrodes, Maxwell stress causes the dielectric to reduce in thickness and expand in area. Continuous measurement of electrical impedance of the hyperelastic capacitors provides information on the state of actuation, giving DEAs self-sensing capabilities.

However, such electrically powered muscle-like actuators tend to have their own challenges. Being driven by high electric fields, DEAs can be prone to failure by dielectric breakdown and electrical ageing. DEAs can also be difficult to scale up to deliver high forces, as such applications typically rely on large areas of dielectric (e.g., in stack actuators), which tend to be much more likely to experience premature electrical failure, following the Weibull distribution for dielectric breakdown. Previous work has attempted to mitigate damage from dielectric breakdown, but these approaches have tended to present their own challenges. In one such approach, self-clearing electrodes have been used to isolate dielectric breakdown sites, but the dielectric itself remains damaged, which degrades the performance of the device. Another such approach utilizes a dielectric layer consisting of a silicone sponge that is swelled with silicone oil, and the oil locally redistributes after failure from electrical or mechanical damage; but this approach tends only to be useful at low actuation strain.

SUMMARY OF THE INVENTION

In view of at least the foregoing, embodiments described herein include a novel class of soft actuators (e.g., for soft robotics applications and the like), and methods for use and manufacturing of such soft actuators. The novel soft actuators are referred to herein as Hydraulically Amplified Self-Healing Electrostatic (HASEL) transducers (or actuators), and such HASEL transducers can provide high-performance, reliable, self-sensing, muscle-mimetic actuators that can overcome important limitations of current soft actuators. The terms "transducer" and "actuator" are used interchangeably throughout the present disclosure. HASEL actuators use an electro-hydraulic mechanism to combine the advantages of fluidic and electrostatic actuators. Use of liquid dielectrics can allow for harnessing hydraulic principles to scale actuation force and strain. A wide range of different modes of actuation can be achieved by pressurizing and displacing a hydraulic fluid inside of deformable structures. HASEL actuators can be designed to linearly elongate or contract upon application of voltage, and can feature three-dimensional mobility. Mechanical and electrical properties can be tuned independently. Additionally, HASEL actuators can be fabricated from a variety of materials and can be compatible with a large number of fabrication techniques.

In particular, the present disclosure relates to HASEL actuators that are referred to as high strain Peano-actuators or HS-Peano-HASEL actuators. The actuators include a deformable shell that defines an enclosed internal cavity and a liquid dielectric contained within the enclosed internal cavity. The actuator includes a first electrode disposed over a first side of the enclosed internal cavity and a second electrode disposed over a second side of the enclosed internal cavity. An active region defines a zipping front in a first dimension along which electrostatic forces between the first and second electrodes draw the first and second electrodes toward each other to displace the liquid dielectric along the zipping front within the enclosed internal cavity upon application of a voltage to the first and second electrodes. A strain axis is defined in a second dimension along which the deformable shell deforms upon the application of a voltage to the first and second electrodes, wherein the first dimension of the zipping front is orthogonal to the second dimension of the strain axis.

BRIEF DESCRIPTION OF DRAWINGS

FIGS. 1A-1F illustrate perspective and cross sectional views of an example actuator including a plurality of actuator cells that are modified in shape through application of different voltages thereto, in accordance with an embodiment.

FIG. 2A illustrates cross-sectional views of HS-Peano-HASEL actuator and existing Peano-HASEL actuator designs, shown here to illustrate the dimensions of the actuators used in performance modeling graphs below, in accordance with an embodiment.

FIGS. 2B-2F illustrate examples of comparative charts for performance of the HS-Peano-HASEL actuator design of the present disclosure compared to existing Peano-HASEL actuator design, as shown in FIG. 2A.

FIGS. 5A and 5B illustrate an example of a strain amplifying pulley system that includes HS-Peano-HASEL actuators, in accordance with an embodiment.

FIGS. 6A-6I illustrate alternative example configurations of HS-Peano-HASEL actuators, in accordance with an embodiment.

DETAILED DESCRIPTION OF THE INVENTION

Figure 2D:
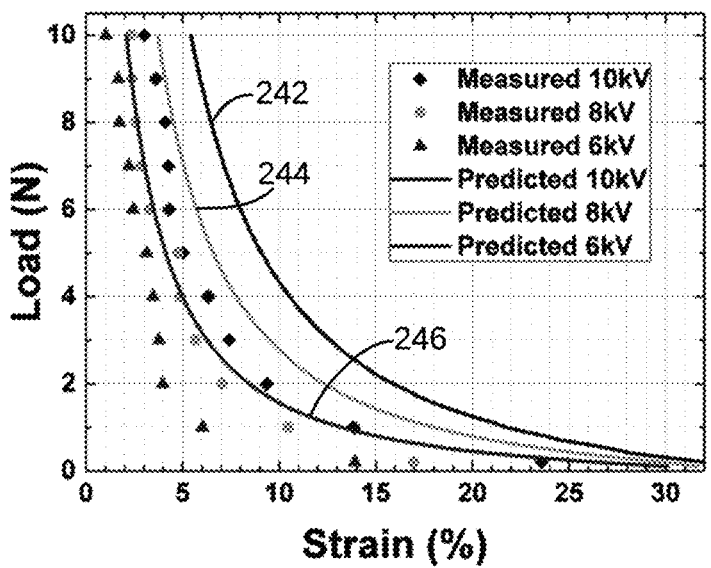

Embodiments described herein include a novel class of soft actuators (e.g., for soft robotics applications), and methods for use and manufacturing of such soft actuators. The novel soft actuators are referred to herein as Hydraulically Amplified Self-Healing Electrostatic (HASEL) transducers (or actuators), and such HASEL transducers can provide high-performance, reliable, self-sensing, muscle-mimetic actuators that can overcome important limitations of current soft actuators. HASEL actuators use an electrohydraulic mechanism to combine the advantages of fluidic and electrostatic actuators. Use of liquid dielectrics can allow for harnessing hydraulic principles to scale actuation force and strain. A wide range of different modes of actuation can be achieved by pressurizing and displacing a hydraulic fluid inside of deformable structures. HASEL actuators can be designed to linearly elongate or contract upon application of voltage, and can feature three-dimensional mobility. Mechanical and electrical properties can be tuned independently. Additionally, HASEL actuators can be fabricated from a variety of materials and can be compatible with a large number of fabrication techniques.

Peano-HASEL actuators like those described in PCT Publication No. WO 2018/175741 have demonstrated fast and precise linear contraction that closely resembles the movement of natural muscle with the potential of high energy density. Therefore, Peano-HASEL actuators are highly suitable as actuators in bioinspired and biomimetic systems. However, the maximum theoretical strain of the Peano-HASEL actuators described in PCT Publication No. WO 2018/175741 is 18%, and strain of 15% is the maximum strain that has been achieved experimentally for these actuators. In contrast, natural muscle typically reaches 20% with a maximum of 40% strain. In turn, the existing Peano-HASEL actuators have limited capability in relation to mimicking natural muscle such as in the use of such actuators in soft robotics applications or other applications in which such actuators may be utilized.

Accordingly, the present disclosure generally includes new configurations of Peano-HASEL actuators that exhibit improved maximum strains, among other advantages. For example, the Peano-HASEL actuators described herein exhibit a maximum theoretical strain of greater than about 20%, greater than about 25%, greater than about 30%, or greater than about 35%. In an example, the maximum theoretical strain achieved by the Peano-HASEL actuators described herein is not less than about 36%. In practice, experimental results have achieved a maximum linear contraction of 23.58% under a load of 0.2 N.

The devices described herein are referred to as high strain Peano-HASELs (HS-Peano-HASELs). HS-Peano-HASELs have demonstrated an excellent overall performance with a blocking force of 18 N, strain rates of 2146%/second, and a specific power of 118 Watts/kilogram. Through prototyping HS-Peano-HASEL actuators with different materials and electrode geometry, the number of actuation units in series can be efficiently increased to scale the stroke of the actuator. For example, a 12-unit HS-Peano-HASEL achieves a stroke of 20.46 mm (17.05% strain). This 12-unit HS-Peano-HASEL actuator may be used as a bioinspired artificial circular muscle (ACM), similar to a primordial heart or a digestive tract. With an example of the ACM, the volume of an elastic diaphragm may be increased, and the internal pressure of a silicone tube may be increased by 1.43 kPa. This pressure increase corresponds to an actuation stress of 13.10 kPa on the inner surface of the contracting region of the ACM that is similar to the mean blood pressure of the left ventricle of the human heart. Furthermore, a HS-Peano-HASEL actuator (e.g., with multiple units) may be utilized with a strain amplifying pulley system to generate a linear actuation strain of 40% or more. In this regard, a HS-Peano-HASEL actuator accompanied by a strain amplifying pulley system fully reproduced the maximum strain of natural muscle, which demonstrates its potential for applications requiring large deformations in a compact region such as animatronic faces and robotic ornithopters heretofore impossible with previous versions of soft actuator technologies.

Compared to previously described Peano-HASELs, HS-Peano-HASELs have additional advantages besides higher strain. Multi-unit HS-Peano-HASELs do not have gaps between the contracting regions of adjacent units, which makes them well-suited as artificial circular muscles with which a large constriction can be generated in a compact volume. Additionally, this feature enables the use of mechanical pulleys in conjunction with the actuator to boost actuation performance. On the other hand, the actuation mechanism of HS-Peano-HASELs may result in actuation units with relatively large widths which might be a drawback for certain applications. However, examples of actuators that achieve large strains without increasing the width of the units are described herein.

With reference to the accompanying drawings, FIGS. 1A-1F illustrate an example of a HS-Peano-HASEL actuator (or simply "actuator"). In this example, electrodes span the entire length of each pouch (or actuation unit), but only a portion of the width. For example, in FIGS. 1A-1F, the electrodes cover the left and right ends of the width of each pouch, but do not cover a central region, as will be discussed in further detail below. In another example described in greater detail in relation to FIGS. 6A and 6B, electrodes may cover only one end of each pouch. In yet another example in FIGS. 7A-7E, the electrodes are the inverse of the design as shown in FIGS. 1A-1F.

In this regard, the design of HS-Peano-HASEL actuators contrasts with existing Peano-HASELs as the electrodes of prior Peano actuators span the entire width of each pouch, but only a portion of the length of the pouch. Accordingly, in view of the new configuration of the HS-Peano-HASEL actuators, these devices are linearly contractile actuators which can theoretically achieve actuation strain as high as 36%. These actuators demonstrate excellent overall performance and an adjustable frequency response, as will be discussed with respect to FIGS. 2A-2F. In addition, the electrode geometry can be modified to change or improve the performance. For example, FIGS. 3C and 3D illustrate the performance of electrodes with notches to promote buckling near the intersection of the electrodes and the contracting region. FIGS. 8A-8D show electrodes that are designed to create actuators that are a hybrid between HS-Peano actuators and regular Peano HASELs, thus being configured to exhibit beneficial properties of each respective actuator type.

Generally, HS-Peano actuators possess rectangular electrodes that span many pouches, in contrast to Peano-HASELs which have separate electrodes that cover each pouch. Therefore, fabricating and/or applying electrodes to HS-Peano actuators may be much easier as compared to previously disclosed Peano-HASELs, especially when creating actuators with many pouches and as smaller length scales. Additionally, the electrodes for HS-Peano actuators require shorter perimeter portions of each electrode, thereby reducing the amount of electric field concentrations during operation, thus reducing the risk of unexpected and unpredictable modes of actuation due to electric fields concentrating at the edge of the electrodes.

HS-Peano-HASELs can be used as tubular pumps, which constrict a working fluid to increase the pressure of the fluid as will be discussed with respect to FIGS. 4A-4D. In addition, HS-Peano-HASELs can be paired with strain amplifying pulley mechanisms to boost actuation strain in a compact region, as will be shown in FIGS. 5A and 5B. Alternate pulley mechanisms can be utilized to increase the force of the actuator. Strain limiting layers can be utilized to direct the deformation of the actuators out of plane, as seen in FIGS. 6H and 6I. In addition, HS-Peano-HASEL actuators can be designed as antagonist muscle pairs, which push the fluid within the pouches from side to side. This process results in an alternating contraction of each side of the actuator and can be utilized to create a crawling motion or a cyclic motion of an engine, for example.

Alternate designs of the dielectric shell (such as a folded actuator) can be utilized to create actuators that achieve large deformations in small form-factors as shown in FIGS. 9A-9D. Further, different materials can be used for the actuators to enhance or modify the performance. For example, a soft and slightly stretchable thermoplastic polyurethane used as the dielectric shell may reduce the constraints between the contracting region and zipping region and therefore increase the actuation strain under low load.

With returned reference to FIGS. 1A-1F, an example design of a HS-Peano-HASEL actuator 100 and the principle of operation is depicted. FIG. 1A includes a perspective view showing a three-unit HS-Peano-HASEL actuator 100 connected to a spring 120 acting as a load. A cross-sectional view of HS-Peano-HASEL actuator 100 is shown in FIG. 1B.

Referring to FIGS. 1A and 1B, HS-Peano-HASEL actuator 100 includes one or more deformable shell 102 with an interior cavity 104. Each deformable shell 102 and interior cavity 104 defines an actuator cell 105. The interior cavity 104 contains a liquid dielectric therein. Each actuator cell 105 further includes at least one first electrode 106 that is disposed over a first side of the interior cavity 104. Each actuator cell also includes at least one second electrode 108 disposed over a second side of internal cavity 104. The HS-Peano-HASEL example shown in FIGS. 1A, 1C, and 1E includes three actuator cells 105, attached to a spring 120 and anchored by a block 122.

Still referring to FIGS. 1A and 1B, each actuator cell defines an actuator width 110 and an actuator length 112. The actuator width 110 is generally orthogonal to a strain axis 114, along which the actuator cell contracts when a voltage is applied to first and second electrodes 106 and 108, respectively. The actuator length 112 is generally parallel to the strain axis 114. The first and second electrodes 106 and 108, respectively, may extend along substantially all of a portion of the actuator length of each actuator cell. In contrast, first and second electrodes 106 and 108, respectively, may extend along only a portion of the actuator width 110 of actuator cell 105, such that a portion of deformable shell 102 remains uncovered by first and second electrodes 106 and 108. As shown in FIG. 1B, the regions of each actuator cell 105 that are covered by first and second electrodes 106 and 108 are referred to as zipping regions 126, while a region of actuator cell 105 that is not covered by first and second electrodes 106 and 108 is referred to as a contracting region 128.

FIGS. 1A and 1B illustrate an initial state of HS-Peano-HASEL actuator 100, in which an initial voltage (e.g., V0=0 volts) is applied across first and second electrodes 106 and 108. With no voltage applied across first and second electrodes 106 and 108, respectively, actuator cells 105 remain undeformed, as shown in FIGS. 1A and 1B. When an increasing voltage is applied across first and second electrodes 106 and 108, respectively (e.g., a first voltage V1 as shown in FIGS. 1C and 1D, and a second voltage V2 as shown in FIGS. 1E and 1F, where V0<V1<V2), electrostatic pressure (i.e., Maxwell stress) drives the liquid dielectric contained within interior cavity 104 from zipping region 126 along a zipping front (indicated by arrows 127, i.e., the direction of fluid flow in response to the contraction of first and second electrodes 106 and 108) toward contracting region 128, moving a zipping front 130 toward strain axis 114. This process increases the hydraulic pressure within deformable shell 102 and leads to the contracting region 128 deforming into a thicker, cylindrical shape, shown as 102' in FIGS. 1C-1D and as 102" in FIGS. 1E-1F. This deformation results in a linear contraction of the actuator along strain axis 114. That is, as the electrostatic pressure due to the applied voltage draws the first electrode 106 to the second electrode 108, the fluid dielectric within interior cavity 104 is moved from zipping region 126 and into contracting region 128, thus causing the linear contraction of the actuation cell as shown in FIGS. 1C-1F. In contrast to prior Peano-HASEL actuators in which zipping front 130 is aligned with strain axis 114, the configuration illustrated in FIGS. 1A-1F show zipping front 130 moves orthogonally with respect to strain axis 114 with application of increasing voltage across first and second electrodes 106 and 108, thus resulting in the increased strain capability of the actuators described herein. As an example, a twelve-unit HS-Peano-HASEL actuator operating at V2=10 kV has been demonstrated to achieve about 17% strain while lifting a 20-g load.

While FIGS. 1A-1F illustrate actuation cells with electrode pairs of first electrodes 106 and second electrodes 108 disposed on opposite sides of width 110 of each actuator cell 105, an actuation cell need not have opposing electrodes as shown. For instance, and as will be described in greater detail below, an actuation cell may include electrodes on a single side thereof.

With reference to FIGS. 2A-2F, comparisons of static and dynamic performance of a HS-Peano-HASEL actuator with a standard Peano-HASEL actuator are illustrated. FIG. 2A shows cross-sectional schematics of a HS-Peano-HASEL actuator 200 and a standard Peano-HASEL actuator 210, which were used for experiments to contrast the performance of the HS-Peano-HASEL and standard Peano-HASEL actuators. Both types of actuators are designed to have the same mass, length and maximum capacitance (e.g., electrical energy input), with the dimensions of the electrodes (represented by gray regions 202 and 212) and interior cavities (represented by white regions 204 and 214) as shown in FIG. 2A. FIG. 2B illustrates a comparison graph 220 of the load-strain characteristics between HS-Peano-HASEL actuator 200 and standard Peano HASEL actuator 210 when operated at 10 kV. For loads up to 6 N, the strain of HS-Peano-HASEL actuator 200, as illustrated by a curve 222, exceeded the strain of standard Peano-HASEL actuator 210, as illustrated by a curve 224. The maximum strain of HS-Peano-HASEL actuator 200 was approximately 24%, compared to approximately 9% for standard Peano-HASEL actuator 210. FIG. 2C illustrates a comparison graph 230 of the load-strain curves of HS-Peano-HASEL actuator 200 and Peano-HASEL 210 as represented by curves 232 and 234, respectively, over the full range of loads up to the blocking force. Inset 235 shows that the Peano-HASEL actuator could lift higher loads at strains up to about 4%.

FIG. 2D illustrates a graph 240 showing a strain rate of HS-Peano actuator 200 as a function of the applied load. A curve 242 represents predicted performance for a 10 kV square-wave applied voltage, while dark diamonds represent the measured performance for the same applied voltage. A curve 244 represents predicted performance for an 8 kV square-wave applied voltage, while light gray circles represent the measured performance for the same applied voltage. A curve 246 represents predicted performance for a 6 kV square-wave applied voltage, while gray triangles represent the measured performance for the same applied voltage. The analytical model used to generate the predicted performance curves is discussed in further detail below with respect to FIGS. 10A and 10B.

Figure 2E:
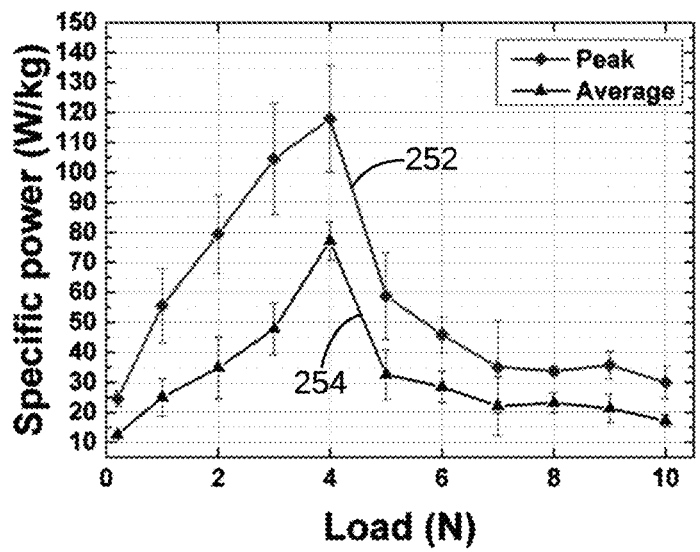
Figure 2F:
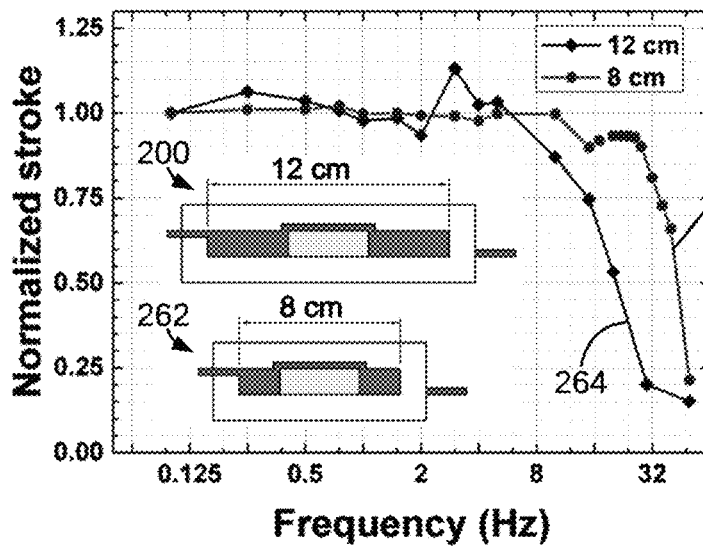
Figure 10A:
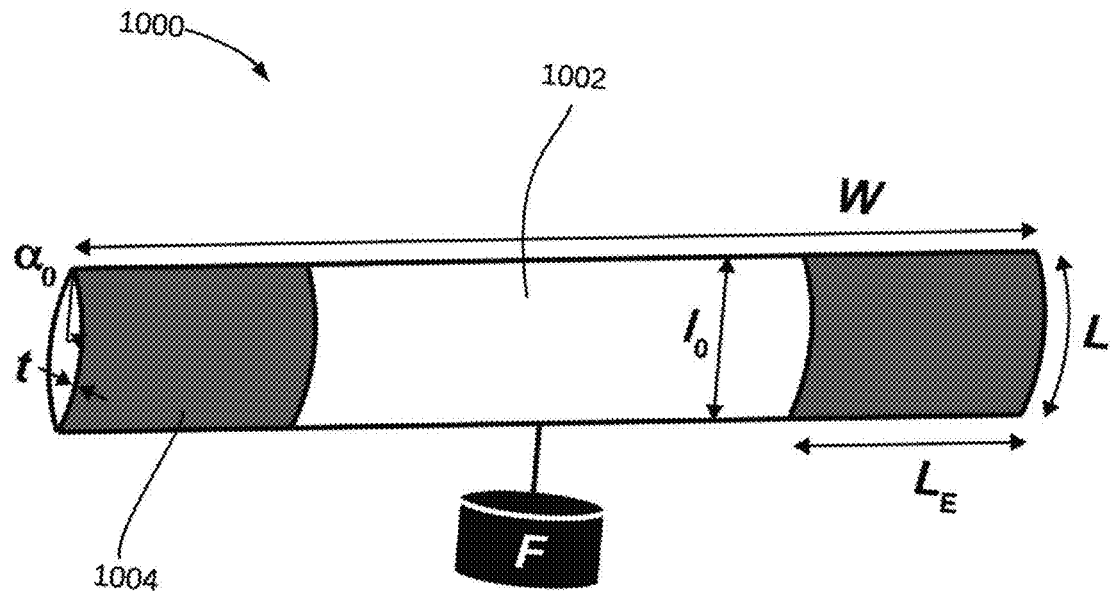
FIGS. 10A and 10B illustrate an example HS-Peano-HASEL actuator, shown here to illustrate the parameters used in the analytical modeling of the performance characteristics of the actuator.
Figure 10B:
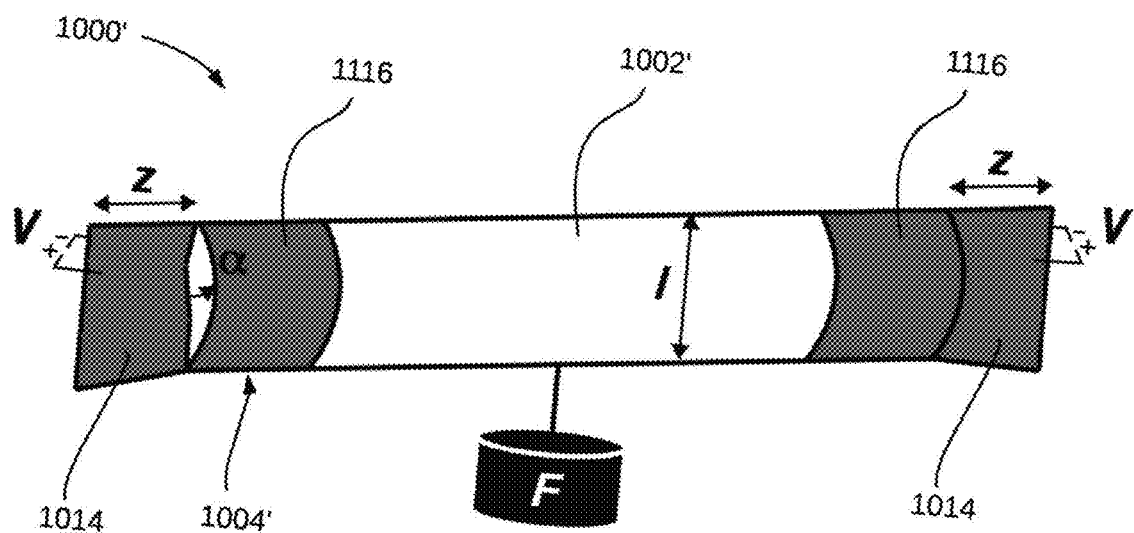

FIG. 2E illustrates a graph 250 showing peak and average specific power measurements of HS-Peano-HASEL actuator 200 as a function of load when driven by a 10-kV square-wave voltage signal. The peak measurements are represented by a curve 252, while the average measurements are represented by a curve 254. FIG. 2F illustrates a graph 260 showing frequency response of a HS-Peano-HASEL actuator as a function of the overall width of the actuator. The top schematic within graph 260 is the same as HS-Peano-HASEL actuator 200 of FIG. 2A and a shorter HS-Peano-HASEL actuator 262 with an 8 cm overall width had the same width and length of the contracting region and the same volume of liquid dielectric as HS-Peano-HASEL actuator 200. A curve 264 represents the normalized stroke performance of HS-Peano-HASEL actuator 200 while a curve 264 represents the normalized stroke performance of shorter HS-Peano-HASEL actuator 262. It is noted that the zipping region of the 8 cm wide actuator is shorter than the zipping region of the 12 cm wide actuator. Therefore, the liquid dielectric in the 8 cm wide actuator is displaced over a shorter distance and the bandwidth of the 8 cm wide actuator is higher (~40 Hz) compared to the 12 cm wide actuator (~20 Hz). These results indicate the ability to tune dynamic performance by varying the geometry of the actuator. Further, the specific power provided by the actuator can be further enhanced by using a lower viscosity dielectric fluid and/or making the pouch length of each unit of the actuator smaller, while maintaining the same overall length of the actuator. A lower viscosity fluid would in turn decrease viscous losses in the pouch during fast and powerful actuation. For instance, consider two actuators made from identical materials that have the same pouch width, overall length, and area of electrodes, where the first actuator includes a single pouch with a length of 10 mm, while the second actuator is formed of ten pouches, each pouch having a length of 1 mm. In this case the second pouch would require overall less dielectric fluid than the first pouch, while providing essentially identical force-stroke behavior and dynamic characteristics. That is, while the second actuator would weigh less because it requires less dielectric fluid, the first and second actuators would actuate in a similar manner while the second actuator would exhibit higher specific power and specific energy. These assertions are supported, for example, in PCT International Patent Application No. PCT/US19/20568 filed on Sep. 4, 2020, entitled "Hydraulically Amplified Self-Healing Electrostatic Transducers Harnessing Zipping Mechanism," which claims priority from U.S. Provisional Patent Application Ser. No. 62/638,170, filed on Mar. 4, 2018, also entitled "Hydraulically Amplified Self-Healing Electrostatic Transducers Harnessing Zipping Mechanism," both of which applications are incorporated herein in their entirety by reference. The analytical model discussed below with respect to FIGS. 10A and 10B are also relevant to these assertions.

Figure 3A:
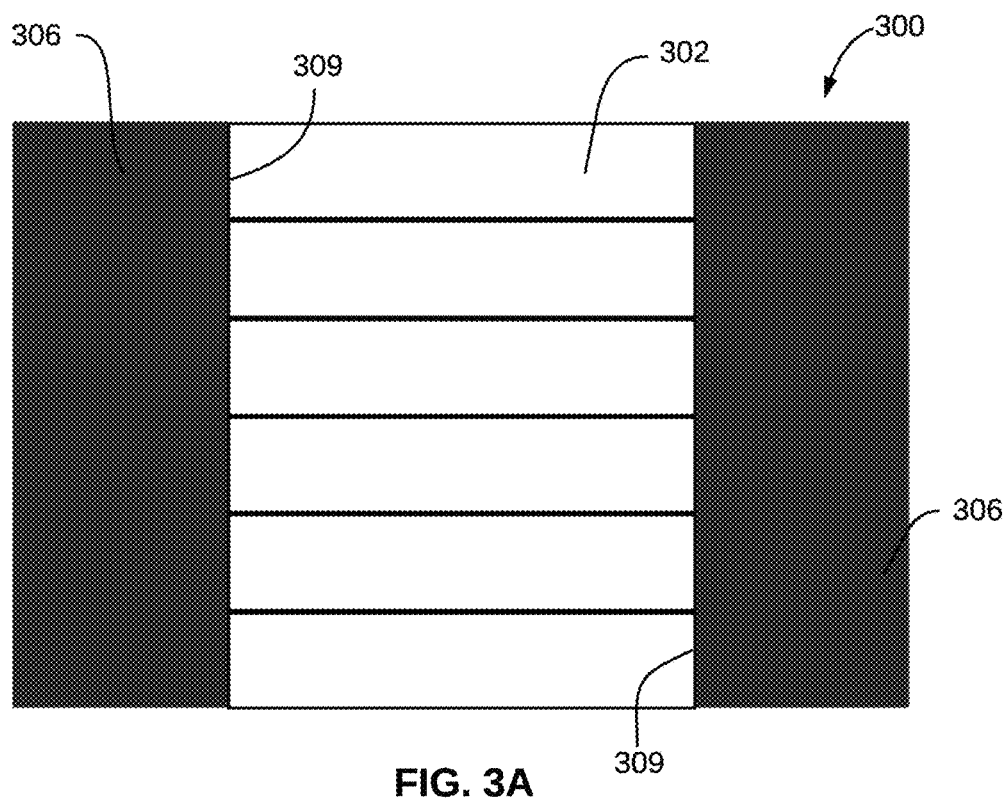
FIGS. 3A and 3B illustrate two examples of HS-Peano-HASEL actuators, in which one example includes a rectangular electrode terminal portion and the other a non-linear or "notched" electrode terminal portion, in accordance with embodiments of the present disclosure.
Figure 3B:
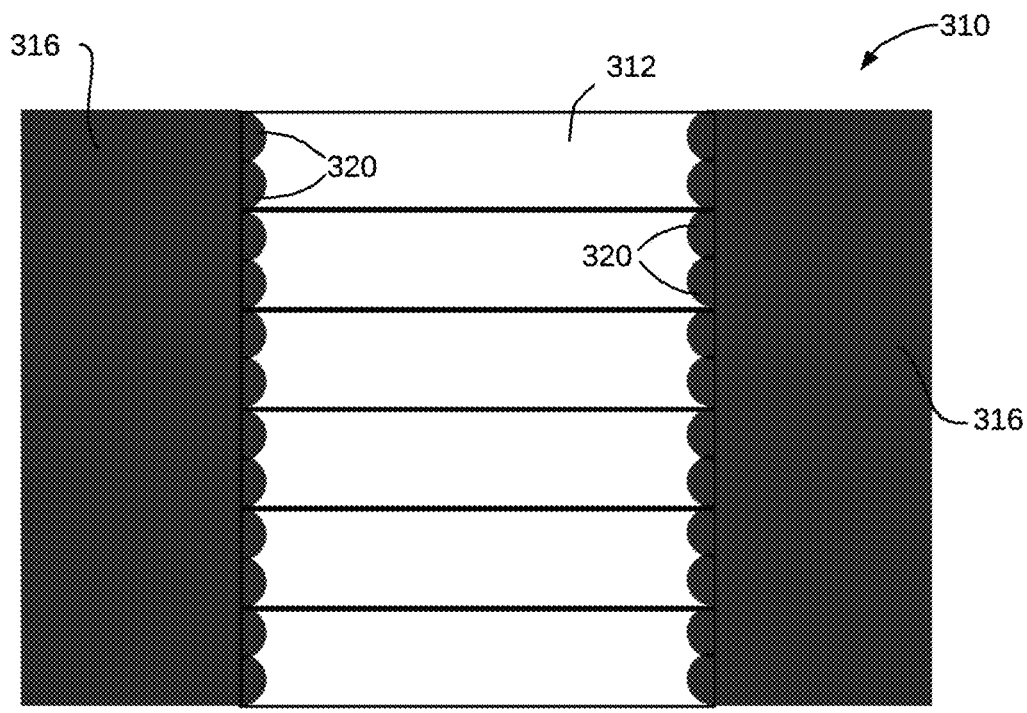
Figure 3C:
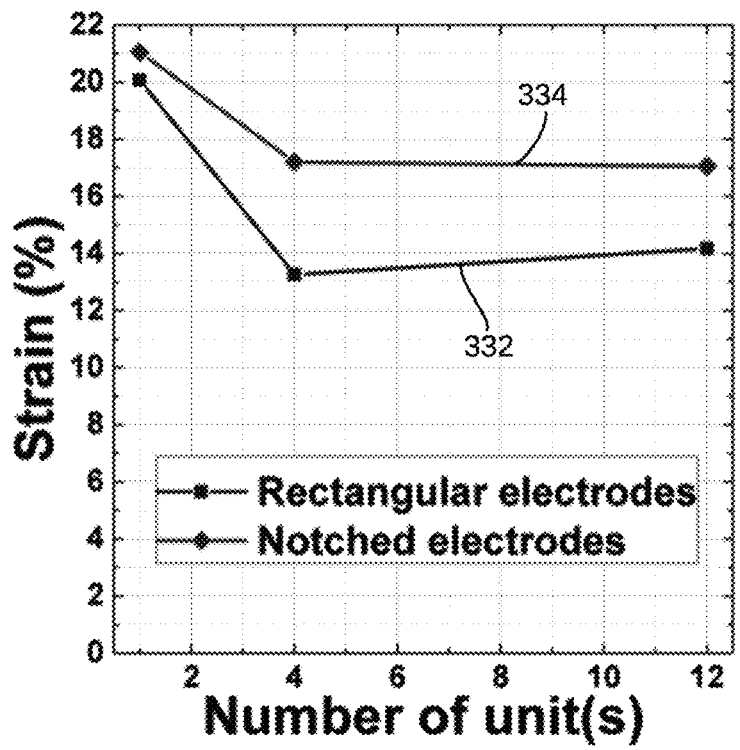
FIGS. 3C and 3D show comparative charts for performance of the HS-Peano-HASEL actuators with rectangular and notched electrodes.
Figure 3D:
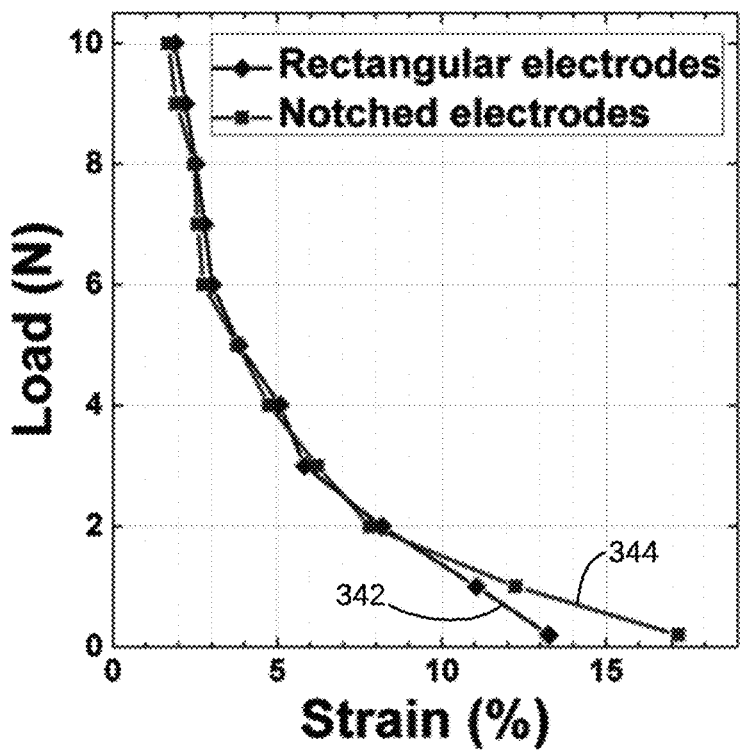

FIGS. 3A-3D illustrate the influence of the shape of the electrode geometries on the load-strain characteristics of multi-unit HS-Peano-HASEL actuators. FIGS. 3A and 3B illustrate front views of two examples of HS-Peano-HASEL actuators. In FIG. 3A, a six-unit HS-Peano-HASEL actuator 300 using rectangular screen-printed electrodes including deformable shells 302 containing a dielectric liquid, first electrodes 306, and second electrodes 308 (not visible) opposite first electrodes 306 is illustrated. First electrodes 306 (and optionally second electrodes 308) of HS-Peano-HASEL actuator 300 of FIG. 3A includes linear, rectangular terminal end portions 309. FIG. 3B shows a six-unit HS-Peano-HASEL actuator 310 including deformable shells 312 containing a dielectric liquid, first electrodes 316, and second electrodes 318 (not visible) opposite first electrodes 316. In HS-Peano-HASEL actuator 310, at least first electrodes 316 (and optionally second electrodes 318) include nonlinear features, shown as notches 320. Multiple HS-Peano-HASEL devices with different numbers of actuator units and electrode shapes were produced and analyzed, and the experimental results are shown in FIGS. 3C and 3D. As illustrated in FIG. 3C showing a graph 330 of the strain percentage as a function of the number of actuator units, HS-Peano-HASEL actuators with rectangular electrodes (e.g., HS-Peano-HASEL actuator 300) reached a strain of about 13% at 10 kV with a 4-unit device under a 20-gram load, as represented by a curve 332. In contrast, a four-unit actuator with notched electrodes contracted by about 17% at 10 kV, as represented by a curve 334. Similarly, FIG. 3D shows a graph 340 comparing the load-strain curves of four-unit HS-Peano-HASELs with rectangular (as represented by curve 342) and notched screen-printed electrodes (as represented by curve 344) at 10 kV. It is noted that the load-strain curves of four-unit actuators based on rectangular and notched electrodes show that notched electrodes may be advantageous over rectangular electrodes in the low-load region.

Figures 4A, 4B:
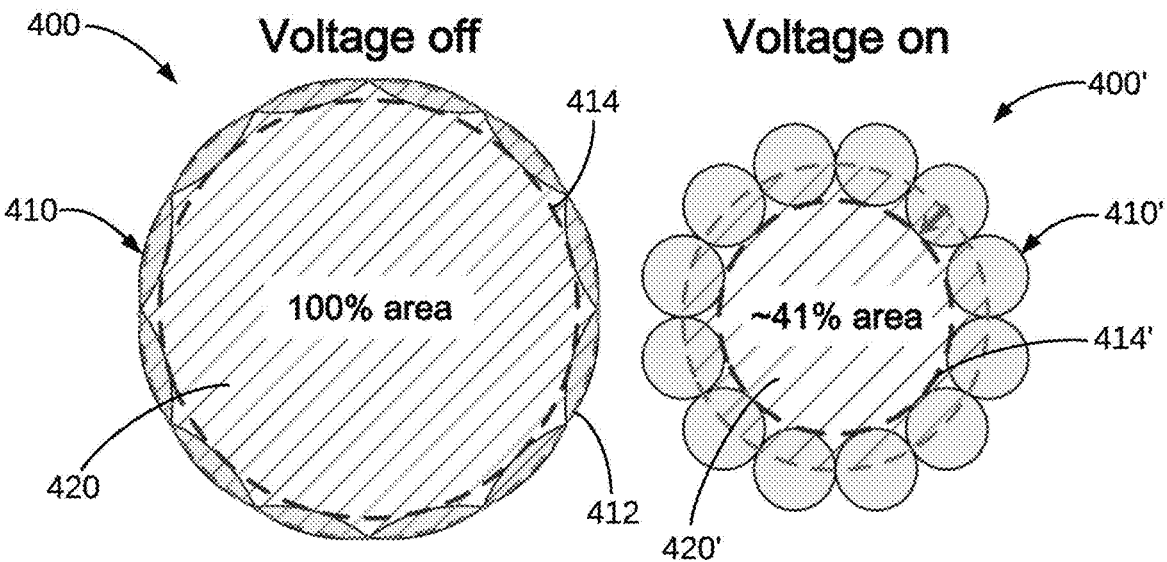
FIGS. 4A-4D illustrate an example of an artificial circular muscle including a HS-Peano-HASEL actuator and performance metrics for the same, in accordance with an embodiment.
Figure 4C:
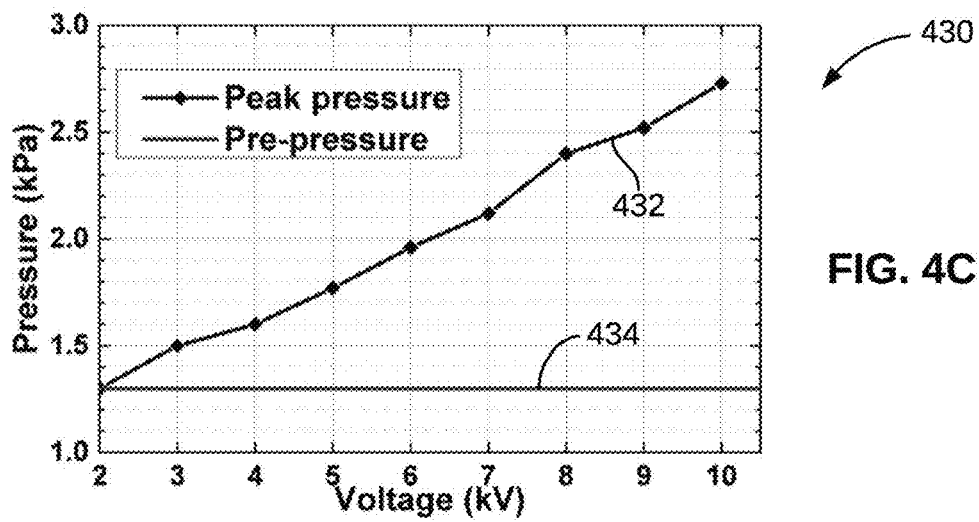
Figure 4D:
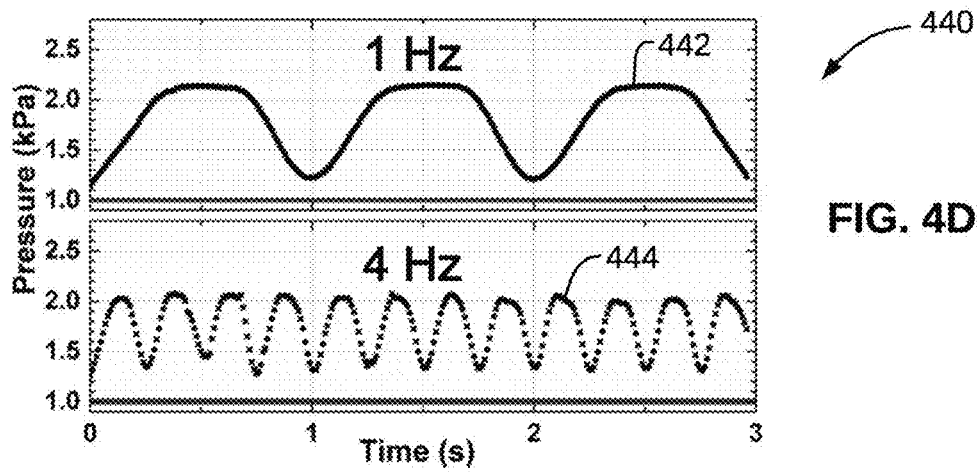

FIGS. 4A-4D present an example of an artificial circular muscle (ACM) and performance thereof. As shown in FIG. 4A, an ACM 400 includes a twelve-unit HS-Peano-HASEL actuator 410 enclosing an outer perimeter 412 and defining an inner perimeter 414 enclosing an internal area 420. FIG. 4B shows a modified ACM 400' when actuator 410 is activated by application of a voltage thereto. As shown in FIG. 4B, internal area 420 enclosed by HS-Peano-HASEL actuator 410 decreases to modified internal area 420', which is about 41% of its initial area when actuated in the illustrated example. ACM 400 may be used for example, for squeezing an object as a pump or in a peristaltic motion, if several ACM 400 are located in series. FIG. 4C illustrates a graph 430 showing an increase of the pressure within the system as a function of voltage applied to ACM 400, with curve 432 representing peak pressure within the internal area of ACM 400 as a function of voltage while line 434 represents pressure within the inner area without activation of ACM 400. FIG. 2D illustrates a graph 440 illustrating pressure-time curves of the system incorporating ACM 400 at 1 Hz and 4 Hz.

FIGS. 5A and 5B illustrate a strain amplifying pulley system. FIG. 5A presents a schematic of a pulley system 500 including an actuator 510 (shown in FIG. 5A as an 8-unit HS-Peano-HASEL actuator), in which a first end 502 of actuator 510 is affixed to a frame 503. A second end 504 is free for movement upon actuation and deactivation of actuator 510, and is shown in FIG. 5A having attached thereto a weight 505. Actuator 510 is disposed about a pulley 512, which is configured for rotation about an axle 514. Prior to activation of actuator 510, second end 504 hangs at a length $L_0$ from the highest point of actuator 510. A modified pulley system 500', shown in FIG. 5B, illustrates the changes to pulley system 500 when a voltage is applied to actuator 510. As shown in FIG. 5B, with the application of voltage, each actuator cell of modified actuator 510' swells such that the overall length of modified actuator 510' contracts and, since end 502 is affixed to frame 503, pulley 512 rotates in a direction indicated by an arrow 530. Thus, weight 505 now hangs at a length $L_1$ from the top of the highest point of modified actuator 510', which is shorter than the original length L0. For example, with the application of a square-wave voltage at 10 kV, a pulley system like that illustrated in FIG. 5A, including a 12-unit HS-Peano-HASEL actuator, amplified the actuation strain from about 17% (shown in FIG. 1E) to about 42%, as shown in FIG. 5B with a 20-g load attached at one end.

Figure 6A:
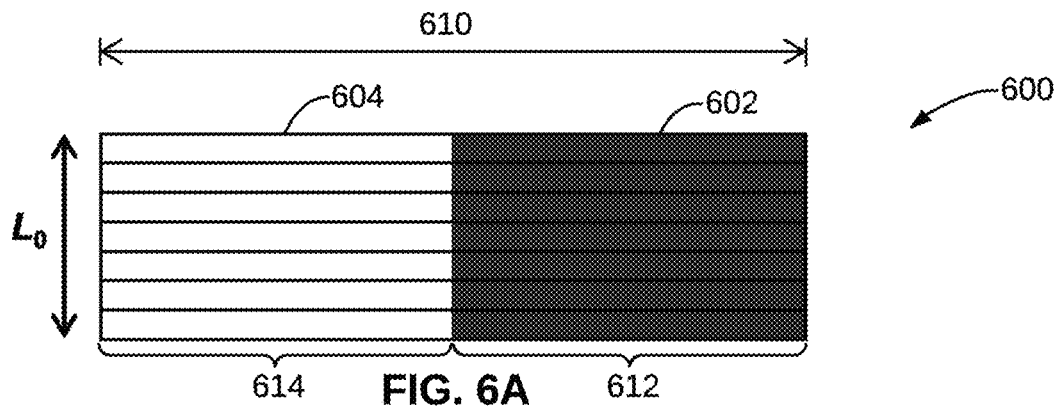
Figure 6B:
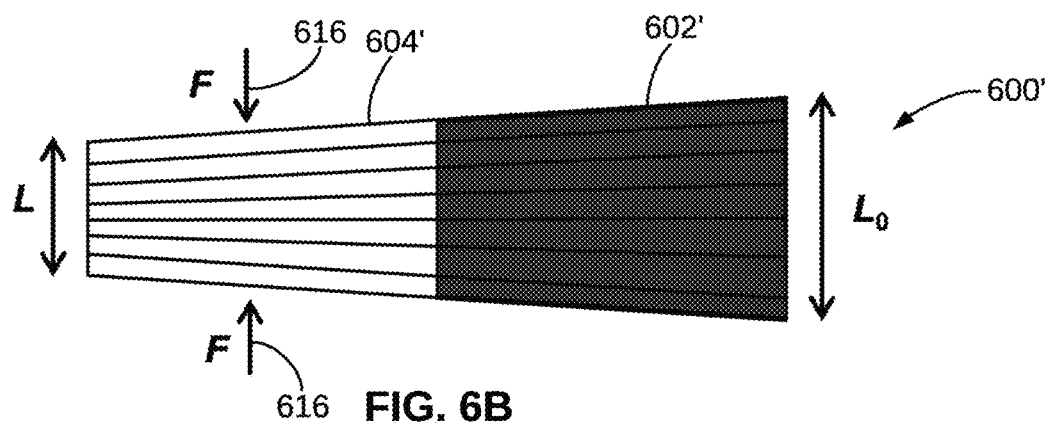
Figures 6C, 6D:
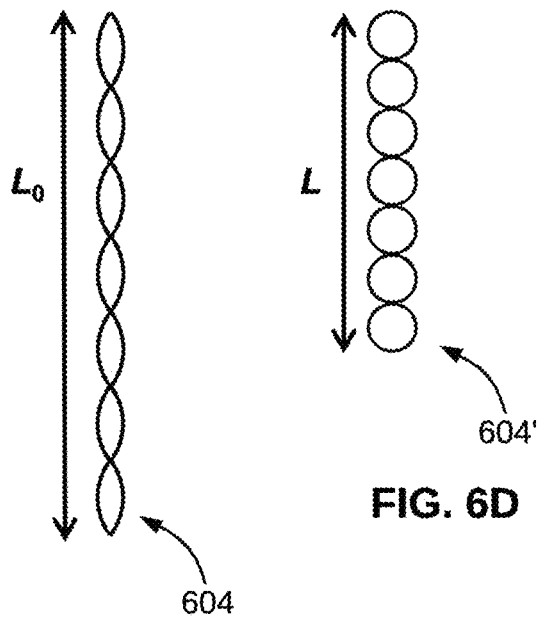

FIGS. 6A-6I illustrate a variety of configurations of HS-Peano-HASEL actuator systems. FIGS. 6A and 6B illustrate a HS-Peano-HASEL actuator system 600 with electrodes 602 covering one side of deformable shells 604, containing dielectric fluid therein. That is, over a width 610 of actuator system 600, one half of actuator system 600 forms an active region 612, while another half of actuator system 600 forms an inactive region 614. For example, as shown in FIG. 6A, when no voltage is applied to electrodes 602, the length of actuator system 600 is shown as L0. Upon application of voltage at the electrodes, electrodes 602' zip together in the active region (e.g., as illustrated in FIGS. 1A-1E), thus forcing the dielectric fluid from active region 612 into inactive region 614, which causes deformable shells 604' to contract with force direction indicated by arrows 616 such that the length of actuator system 600' contracts to L at the end of inactive region 614. The contraction of actuator system 600 on one side is shown in a side view in FIGS. 6C and 6D.

Figure 6E:
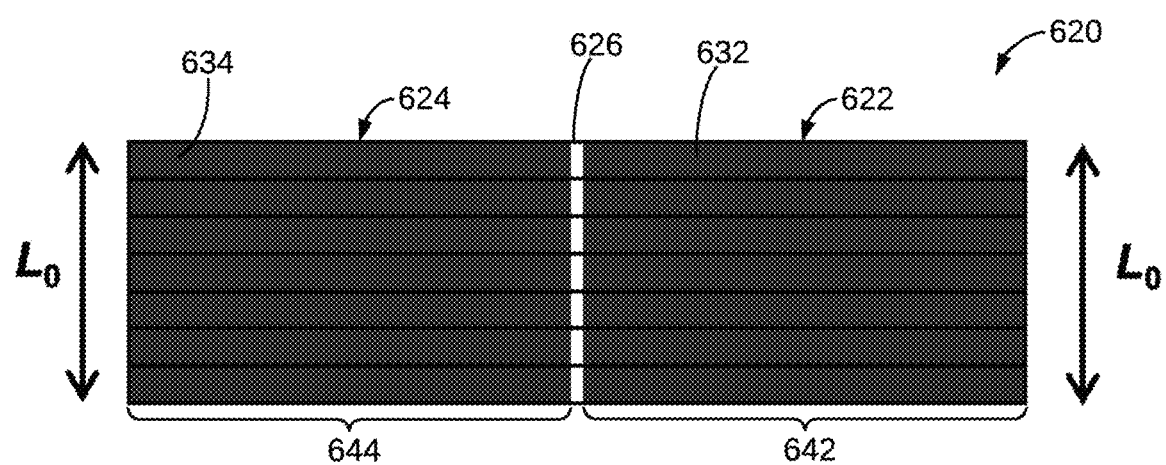
Figure 6F:
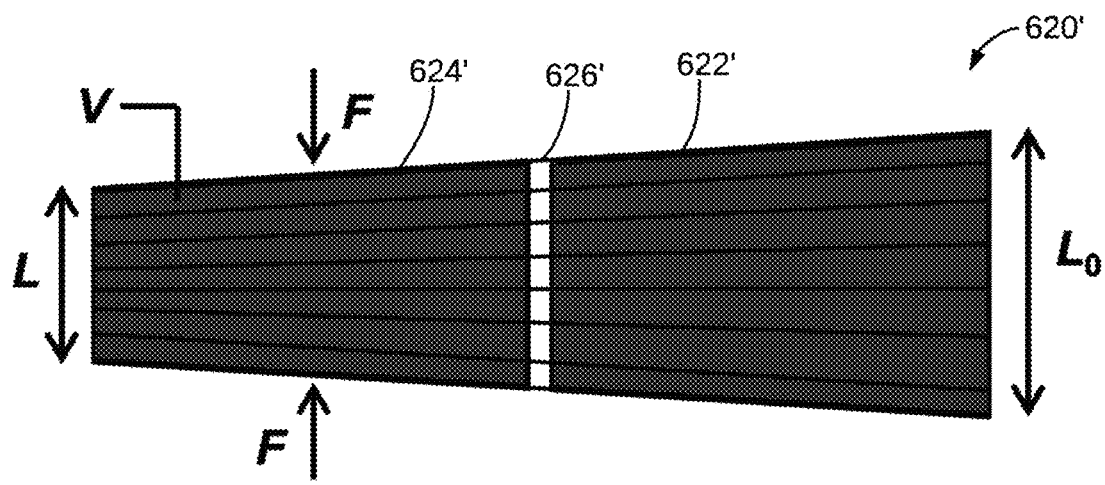
Figure 6G:
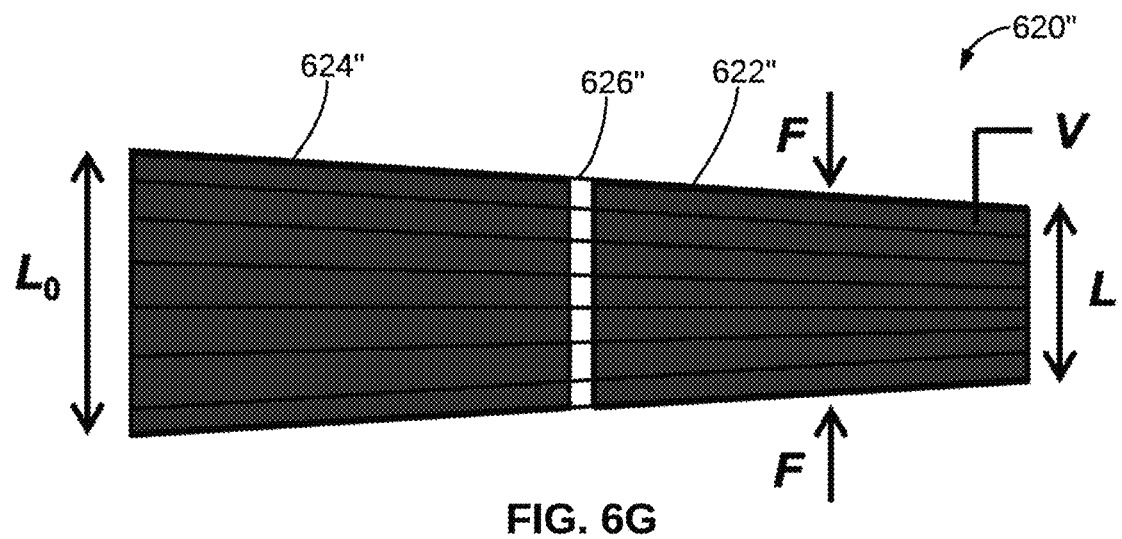

As an alternative, as shown in FIGS. 6E-6G, two sets of electrically insulated electrodes can be used with one HS-Peano-HASEL actuator to create an antagonist pair of actuators. As shown in FIG. 6E, an actuator system 620 (shown here with a 7-unit HS-Peano-HASEL actuator) includes a first electrode pair 622 and a second electrode pair 624. First electrode pair 622 includes a first front electrode 632 and a first back electrode (not visible). Second electrode pair 624 includes a second front electrode 634 and a second back electrode (not visible). First and second electrode pairs 622 and 624 are electrically separated by a gap 626 such that first and second electrode pairs 622 and 624 can be controlled independently. When no voltage is applied to either first or second electrode pairs 622 and 624, both sides of actuator system 620 has a length $L_0$. When first electrode pair 622 on the right side of actuator system 620 as shown in FIG. 6E is activated, the dielectric fluid contained within actuator system 620 is forced from right active region 642 and into left active region 644 in the left half of actuator system 620, causing the left side of modified actuator system 620' to contract to a length L (as seen in FIG. 6F). Alternatively, when second electrode pair 624 is activated, the dielectric fluid within actuator system 620 is forced from left active region 644 into right active region 642, causing the right side of modified actuator system 620" to contract to a length L (as seen in FIG. 6G). This process can be repeated to create alternating contraction on each side of the actuator.

FIGS. 6H and 6I illustrate the use of a strain-limiting layer to control the deformation of HS-Peano-HASEL actuators. As shown in FIG. 6H, an actuator system 650 includes a 7-unit HS-Peano-HASEL actuator 652. One side of actuator 652 is affixed to a strain-limiting layer 654. In an example, strain-limiting layer 654 is a flexible yet non-stretchable material such as a thin sheet of aluminum or flexible plastic sheets, such as polyethylene, elastomers and closed-cell foam. When one or more unit cells of actuator 652 is activated with the application of a voltage thereto, actuator 652 contracts although, due to the strain-limiting layer, actuator system 650 deforms to bend, as shown in FIG. 6I. That is, when voltage is applied, the actuator bends away from the strain limiting layer; in this case, resembling the motion of an inch worm. Thus, rather than being constrained to in-plane contraction as previously discussed, the addition of a strain-limiting layer to the actuator system can allow out-of-plane actuation using the actuator systems described herein. Other applications of the use of strain-limiting layers is further described in PCT Application No. PCT/US2019/020568, which is incorporated by reference herein.

Figure 7A:
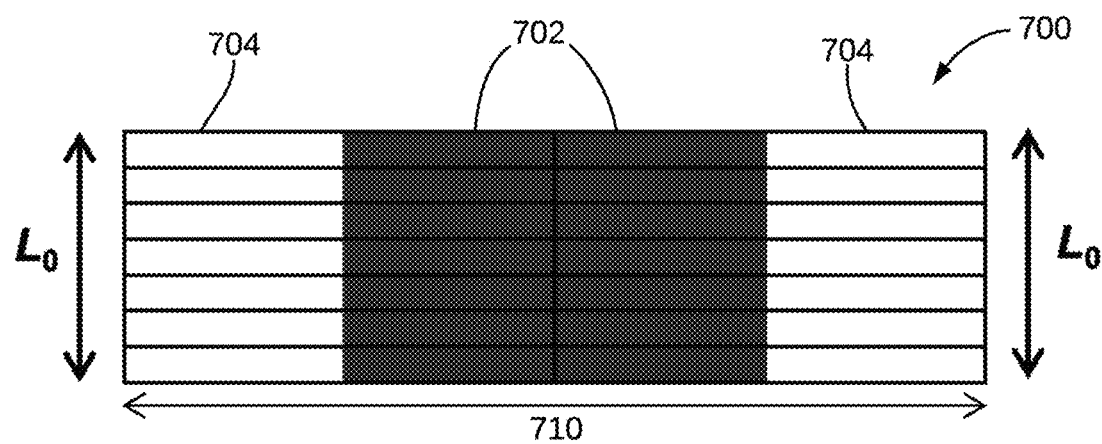
FIGS. 7A-7E illustrate additional example configurations for actuators according to embodiments of the present disclosure.
Figure 7B:
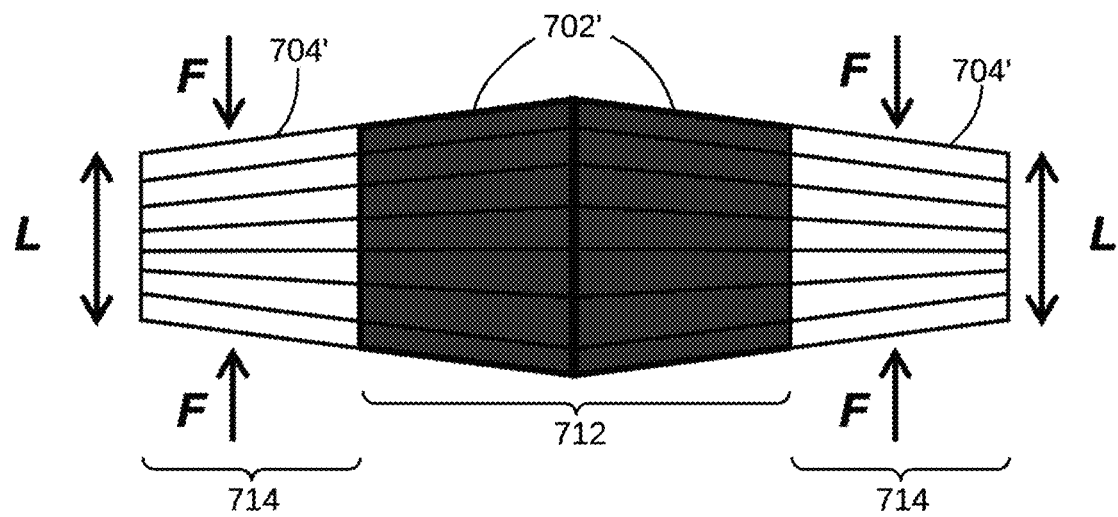

FIGS. 7A and 7B illustrate a HS-Peano-HASEL actuator 700 with electrodes 702 in the center of cells 704 (i.e., the inverse of the electrode designs as shown in FIGS. 1A-1E). As shown in FIG. 7A, electrodes 70s cover a portion of the center of the width of cells 704, in this case approximately half of the total pouch width (indicated by double-headed arrows 710) such that actuator 700 exhibits a length L0 when no voltage is applied to electrodes 702. Upon application of voltage, electrodes 702 zip together forcing the dielectric fluid inside cells 704 from active region 712 into regions inactive regions 714, which are not covered by electrodes 702, causing the inactive regions 714 to contract such that the length of modified actuator 700 at the edges is now L. Since the placement of the electrodes in the design shown in FIGS. 7A and 7B is far from the edges of the actuator, the risk of dielectric breakdown through the air at the edges of the actuator is mitigated and the plastic film at the left and right edges of the actuator can be minimized, thus reducing mechanical constraints at those edges.

Figure 7C:
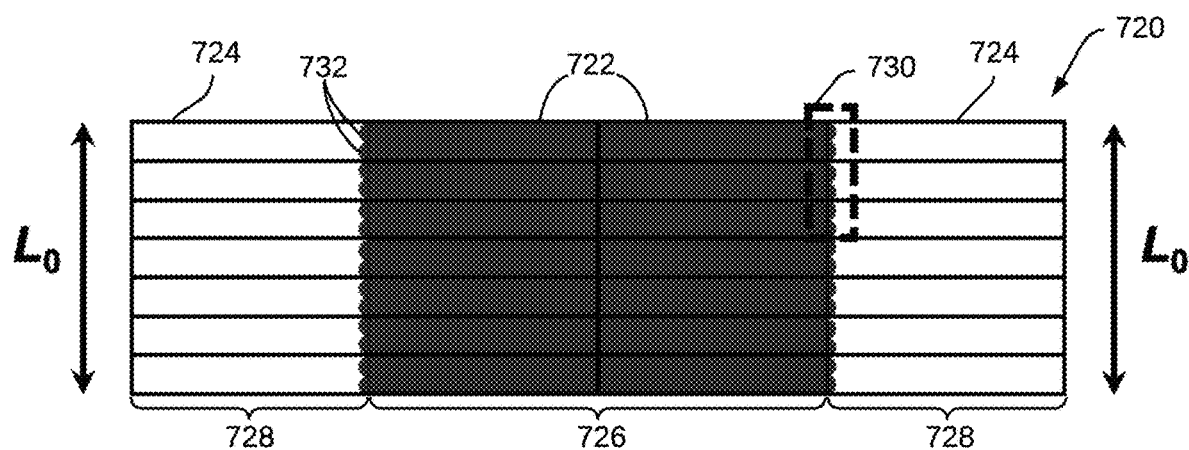
Figure 7D:
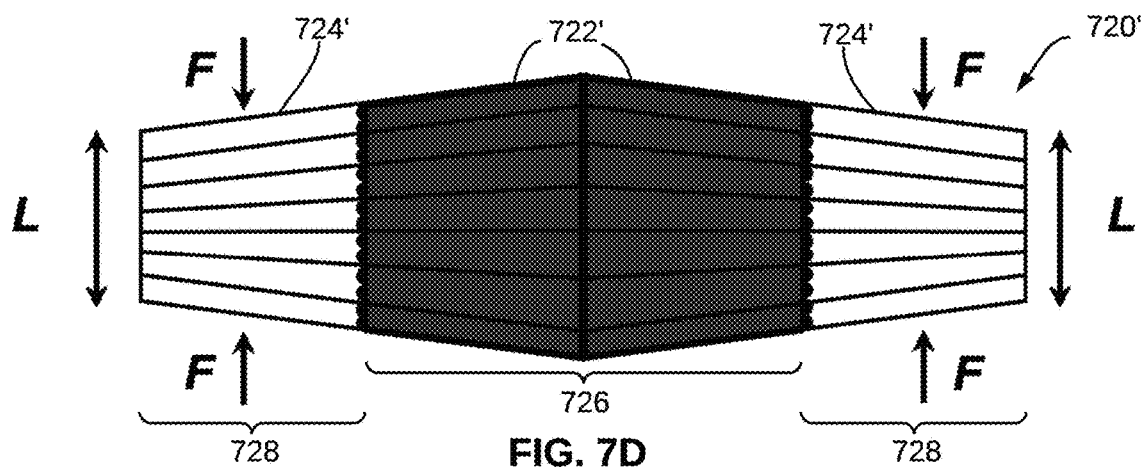
Figure 7E:
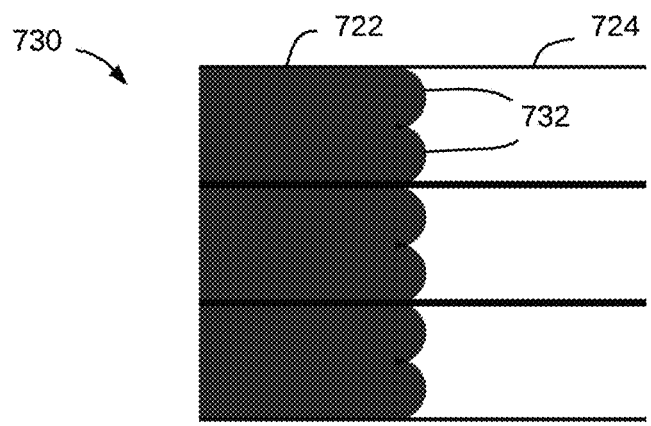

FIGS. 7C-7E illustrate an embodiment similar to that illustrated in FIGS. 7A and 7B, with notched electrodes as previously discussed in FIGS. 3B-3D. As shown in FIG. 7C, a HS-Peano-HASEL actuator 720 includes electrodes 722 covering a center area of cells 724, defining an active region 726 and inactive regions 728. The initial length of actuator 720, with no voltage applied to electrodes 722, is L0. When a voltage is applied to electrode 722, dielectric fluid contained within cells 724 are pushed out of active region 726 and into inactive regions 728, thus causing cells 724' to contract such that the length of modified actuator 720' is shortened to L. As is more visible in inset 730, shown in FIGS. 7C and 7E, the edges of electrodes 722 include notched features 732, such as shown in FIGS. 3B, leading to improved load-strain performance.

Figure 8A:
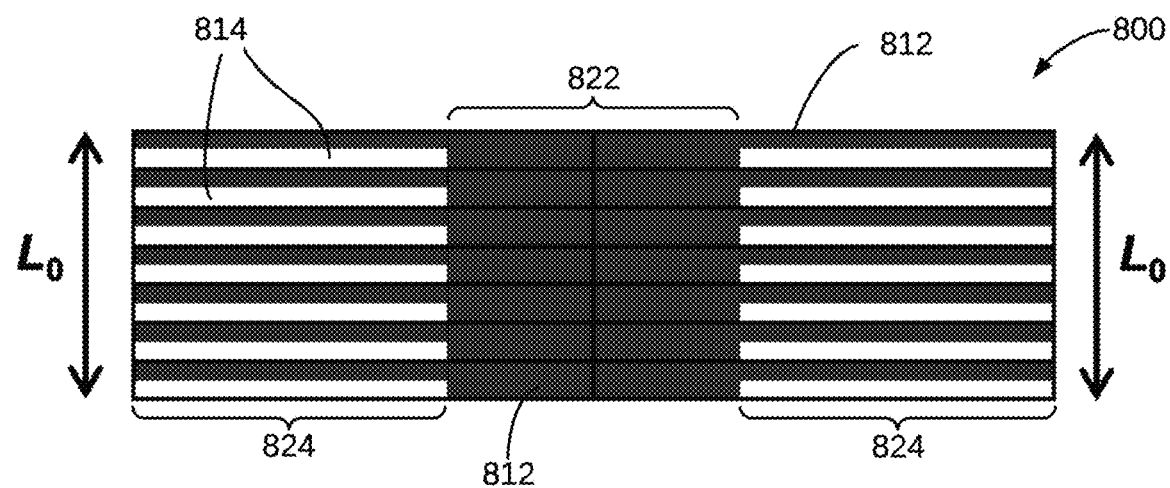
FIGS. 8A-8D illustrate example hybrid HS-Peano-HASEL and Peano-HASEL actuators, in accordance with embodiments of the present disclosure.
Figure 8B:
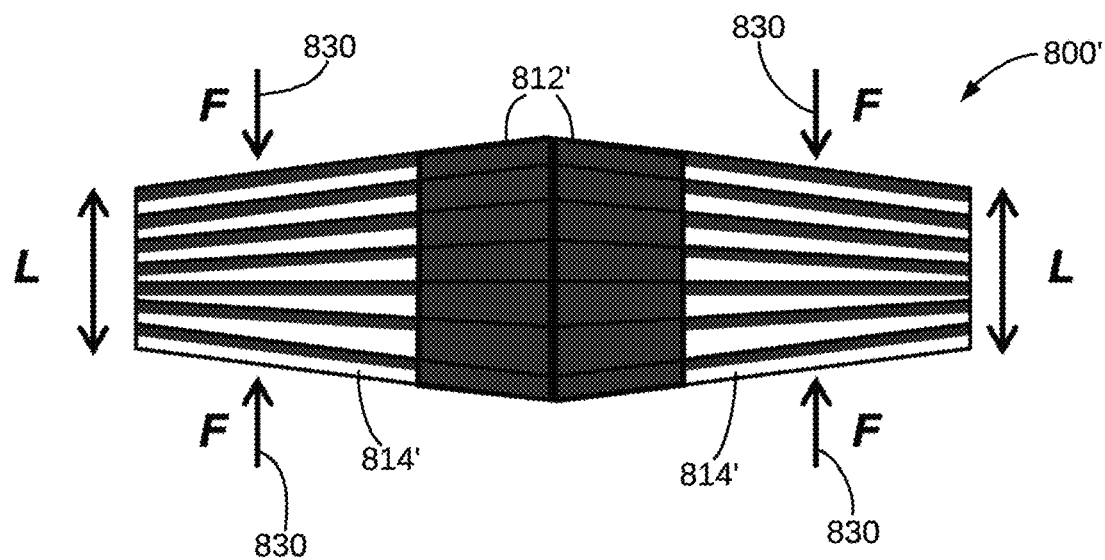

FIGS. 8A-8D illustrate further modifications to the electrode design to change the actuation performance of HS-Peano-HASEL actuators. In an actuator 800 as shown in FIG. 8A, the electrodes are designed as a hybrid between HS-Peano actuators and previously described Peano-HASEL actuators such that electrodes 812 cover the center of actuator 800 as well as are interwoven with spaces 814 without electrodes on the outer portions of actuator 800. In this way, actuator 800, in turn, exhibit characteristics of both standard Peano-HASEL and HS-Peano-HASEL actuators. For example, when voltage is applied to electrodes 812, the dielectric fluid within actuator 800 are pushed away from those areas covered by electrodes 812 into spaces 814. By modifying the shapes and sizes of the electrodes as well as adjusting the ratio of areas covered by electrodes versus spaces 814, the compressive forces F (indicated by arrows 830) can be tailored. Further, actuator 800 can achieve greater strain under low loads (similar to the HS-Peano-HASEL actuators described above), while also maintaining a high blocking force (like existing Peano-HASEL actuators described in the incorporated applications).

Figure 8C:
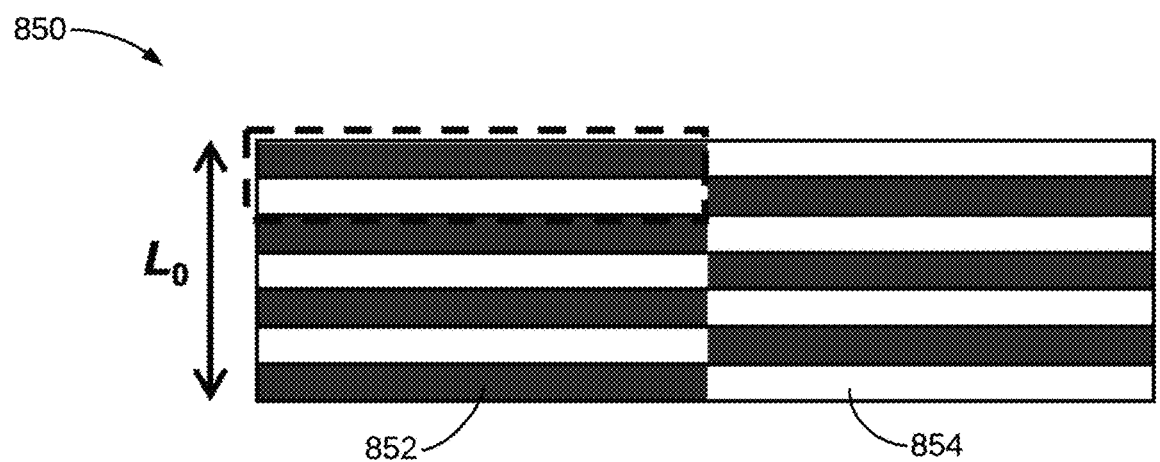
Figure 8D:
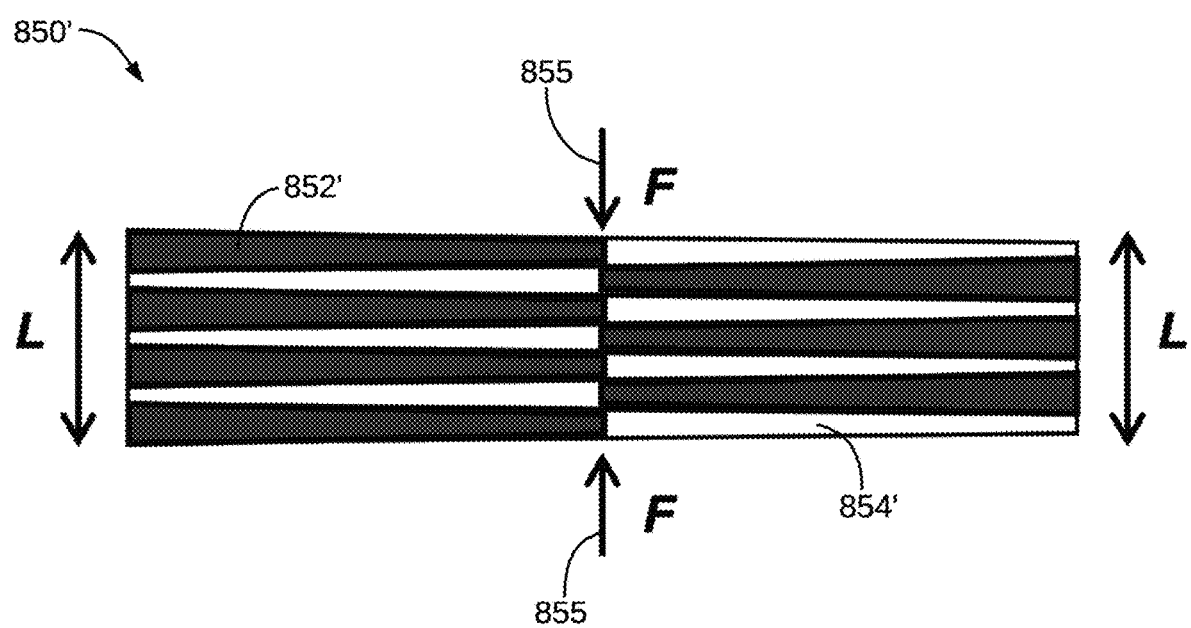

Alternatively, as illustrated in FIGS. 8C and 8D, the electrodes can be designed in a checkered pattern to more evenly distribute the dielectric fluid throughout the pouches of the actuator. For example, an actuator 850 includes a staggered pattern of electrodes 852 and spaces 854 such that, when voltage is applied to one or more of electrodes 852, the dielectric fluid contained within actuator 850 can be more evenly distributed throughout actuator 850 and, consequently, the overall length of actuator 850 is reduced as compressive forces F (indicated by arrows 855) are more uniformly applied to actuator 850.

Figure 9A:
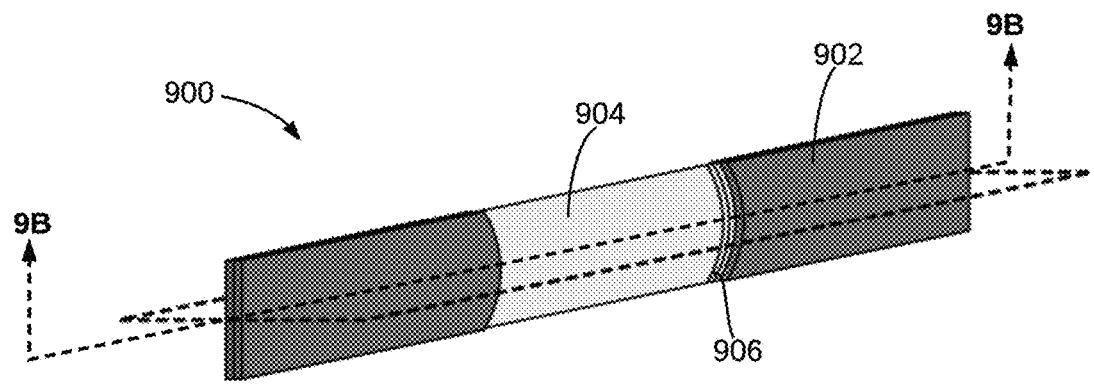
FIGS. 9A-9D illustrate an example HS-Peano-HASEL actuator that includes a folded configuration for reduced actuator width, in accordance with an embodiment.
Figure 9B:
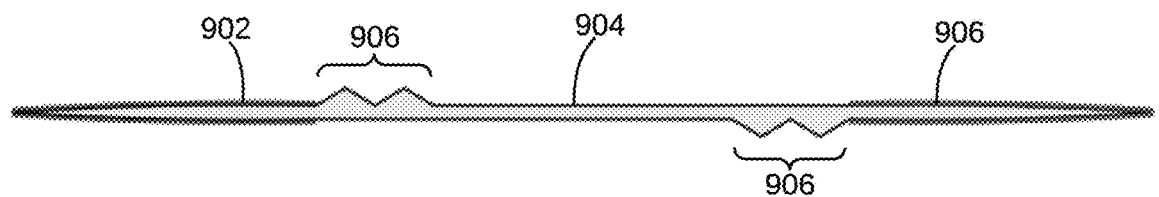
Figures 9C, 9D:
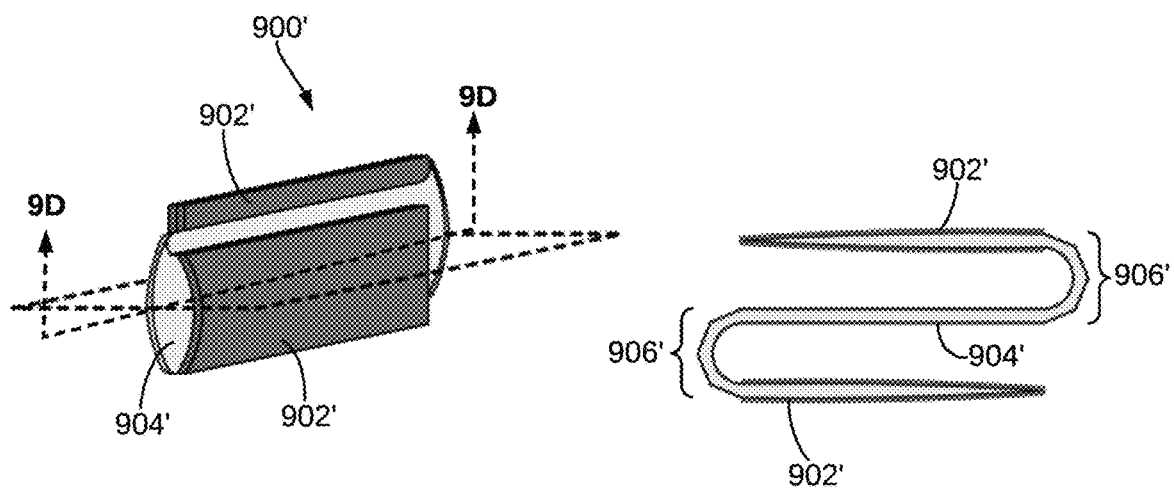

FIGS. 9A-9D illustrate a foldable HS-Peano-HASEL actuator configuration. As shown in FIG. 9A, an HS-Peano actuator 900 includes electrodes 902 covering the edges of a deformable shell 904. Deformable shell 904 includes "origami" structures 906, which are configured to promote selective expansion of deformable shell 904 at origami structures 906, essentially reverse of the use of strain-limiting structures as discussed above. An example of a configuration for origami structures 906 is more visible in the cross-sectional view shown in FIG. 9B. When a voltage is applied to electrodes 902, the dielectric fluid within deformable shell 904 is pushed away from electrodes 902 and into the center portion of deformable shell 904, as shown in FIG. 9C. Due to the presence of origami structures 906, deformable shell 904 preferentially expands at origami structures 906 such that actuator 900 is folded into an S-shape, as is more viewable in cross-sectional view shown in FIG. 9D. This design as shown in FIGS. 9A-9D allows actuator 900 to achieve high strains (up to 36% maximum theoretically) without necessitating an actuator with a large width.

The performance of HS-Peano-HASEL actuators may be predicted using an analytical model. As an example, a simple analytic model that describes the stress-strain behavior of the HS-Peano-HASEL actuator can be developed as follows.

It is assumed that the shell of the pouch of a HS-Peano-HASEL actuator 1000 is formed of two flexible but inextensible, rectangular sheets of width W and length L that are bonded at the edges to form a rectangular pouch 1002, as illustrated in FIG. 10A. The thickness t of the sheets is assumed to be small so that their bending stiffness can be neglected. Edge effects at the ends of the actuator are also assumed to be negligible. With these assumptions, the shell takes the shape of two intersecting cylinder sections with central angle $2\alpha_0$, when it is filled with an incompressible, liquid dielectric of volume $\upsilon$ and loaded with a load F. The angle ⍺0 can be calculated from the equation:

$$\upsilon = L^2 w \frac{2\alpha_0 - \sin(2\alpha_0)}{4\alpha_0^2}. \qquad [\text{Eq. 1}]$$

Then, the initial length $l_0$ of the actuator can be expressed as:

$$l_0 = L \frac{\sin(\alpha_0)}{\alpha_0}. \qquad [\text{Eq. 2}]$$

At each end of pouch 1002, electrodes 1004 of length LE cover both sides of the pouch. FIG. 10B illustrates a modified HS-Peano-HASEL actuator 1000' with a voltage V applied across the electrodes on opposite surfaces of the pouch. When a voltage is applied across electrodes 1004', a first portion 1014 of electrodes 1004' zip together a length z from the ends of actuator 1000', displacing the liquid dielectric towards the center of pouch 1002' and thus shortening of the actuator to a length l due to the decreased volume available within pouch 1002' to contain the liquid dielectric. A second portion 1016 of electrodes 1004' is shown as unzipped in FIG. 10B. With the increased voltage, in an example, essentially all of electrodes 1004 may be zipped together such that first portion 1014 displaces second portion 1016. It is assumed that a transition zone between the zipped region of the electrode and the liquid-filled region of the actuator is negligible and that the transition from the zipped electrodes to the liquid-filled region occurs in a discrete step. With this assumption, the walls of the pouch remain cylinder sections, whose central angles $2\alpha$ with the voltage applied across the electrodes can be expressed as:

$$\upsilon = L^2(w - 2z)\frac{2\alpha - \sin(2\alpha)}{4\alpha}. \quad \text{[Eq. 3]}$$

In the center, the length of the actuator reduces to:

$$l = L\frac{\sin(\alpha)}{\alpha}, \quad \text{[Eq. 4]}$$

Then the strain e of the actuator can be expressed as:

$$e = 1 - \frac{l}{l_0} = 1 - \frac{\alpha_0}{\alpha}\frac{\sin(\alpha)}{\sin(\alpha_0)}. \quad \text{[Eq. 5]}$$

The free energy of the system is then expressed as:

$$H = -QV + \frac{1}{2}\frac{\varepsilon t}{Lz}Q^2 - (l - l_0)F. \quad \text{[Eq. 6]}$$

In Eq. 6, the first term describes the amount by which the free energy of the voltage sources decreases when a charge Q flows to the electrodes. The second term describes the energy stored in the electric field in the zipped region, which is assumed to behave like a plate capacitor, where the dielectric constant of the material of the shell is represented by $\varepsilon$. All contributions of the electric energy in the non-zipped region of the pouch are considered negligible. The third term of Eq. 6 describes the change in the free energy of the load, when the actuator contracts. Minimization of Eq. 6 with respect to Q, z and l under the constraint of Eq. 3 (i.e., incompressibility of the dielectric liquid) leads to the equations of state (parameterized by $\alpha$):

$$F = \varepsilon V^2 \frac{\upsilon}{tL^2}\frac{\alpha^3 \cos(\alpha)}{(\alpha - \sin(\alpha)\cos(\alpha))^2} \quad \text{[Eq. 7]}$$

$$Q = \varepsilon V \frac{L}{t}\left(w - \frac{\upsilon}{L^2}\frac{\alpha^2}{\alpha - \sin(\alpha)\cos(\alpha)}\right) \quad \text{[Eq. 8]}$$

The maximum strain of the HS-Peano-HASEL actuator depends on the initial angle $\alpha_0$ and the maximum value that $\alpha$ can take (i.e., as expressed by Eq. 5). The smallest value of $\alpha_0$ is zero, which corresponds to an actuator that is filled with an infinitesimally small amount of liquid dielectric ($\upsilon \rightarrow 0$). The maximum value of $\alpha$ is limited by two cases: (i) the electrodes are completely zipped together; and (ii) at $\alpha = \pi/2$ (i.e., the shell in the center of the actuator takes the shape of a cylinder) such that further deformation is geometrically blocked, even when the electrodes are not completely zipped. Case (ii) can generally be achieved with sufficiently long electrodes. Substituting the two limiting values for $\alpha_0$ and $\alpha$ in Eq. 5 leads to an expression of the maximum theoretically possible strain:

$$e_{max} = 1 - \frac{2}{\pi} = 36\% \quad \text{[Eq. 9]}$$

$$Q = \varepsilon V \frac{L}{t}\left(w - \frac{\upsilon}{L^2}\frac{\alpha^2}{\alpha - \sin(\alpha)\cos(\alpha)}\right). \quad \text{[Eq. 10]}$$

The above equations can be used to compare the predicted stress-strain curves (F/2wt) of the theoretical model with the calculated actuation stresses for the HS-Peano-HASEL actuator shown in FIG. 2A, the following parameters were used with the equations above: w=12 cm, L=1 cm, t=18 μm, $\varepsilon = 1.95 \cdot 10^{-11}$ F/m$^2$, and $\upsilon$=1.2 ml. Adjustments to the parameters can be made in order to predict the performance of HS-Peano-HASEL actuators with different characteristics from those shown in FIGS. 10A and 10B.

The various techniques described herein can be implemented with any suitable hardware and/or software component(s) and/or module(s), including, but not limited to circuits, application specific integrated circuits (ASICs), general purpose processors, digital signal processors (DSPs), field programmable gate arrays (FPGAs), programmable logic devices (PLD), discrete gates, transistor logic devices, discrete hardware components, or combinations thereof. For instance, control of the voltage application to the various designs of HS-Peano-HASEL actuators may be performed by electronic components controlled by firmware or software. As an example, steps of methods or algorithms, or other functionality described in connection with embodiments, can be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims. The various operations of methods and functions of certain system components described above can be performed by any suitable means capable of performing the corresponding functions.

Other examples and implementations are within the scope and spirit of the disclosure and appended claims. For example, features implementing functions can also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

It will be readily appreciated that many deviations may be made from the specific embodiments disclosed in the specification without departing from the spirit and scope of the invention. For instance, some arrangements envision that different data item types may require different amounts of processing time by the processors and this may be taken account in the above discussion in any appropriate manner.

As mentioned, embodiments disclosed herein can be implemented as one or more computer program products, i.e., one or more modules of computer program instructions encoded on a computer-readable medium for execution by, or to control the operation of, data processing apparatus (processors, cores, etc.). The computer-readable medium can be a machine-readable storage device, a machine-readable storage substrate, a memory device, a composition of matter affecting a machine-readable propagated signal, or a combination of one or more of them. In addition to hardware, code that creates an execution environment for the computer program in question may be provided, e.g., code that constitutes processor firmware, a protocol stack, a database management system, an operating system, or a combination of one or more of them.

Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The invention claimed is:

1. An electro-hydraulic actuator, comprising:
a plurality of actuator cells, each actuator cell comprising
a deformable shell that defines an enclosed internal cavity,
a liquid dielectric contained within the enclosed internal cavity,
a first electrode disposed over a first side of the deformable shell, and
a second electrode disposed over a second side of the deformable shell;
wherein a distance between the first and second electrodes decreases from a first reference point on a first reference axis through the enclosed internal cavity to a second reference point on the first reference axis in the absence of a voltage being applied to the first and second electrodes,
wherein, upon application of the voltage to the first and second electrodes, electrostatic forces between the first and second electrodes progressively draws the first and second electrodes to drive the liquid dielectric along a zipping front in a first dimension such that the deformable shell deforms along a strain axis in a second dimension, the second dimension being orthogonal to the first dimension, and
wherein, in at least one of the plurality of actuator cells, a terminal end portion of at least one of the first and second electrodes include a non-linear edge configuration.

2. The electro-hydraulic actuator of claim 1, wherein the plurality of actuator cells are arranged with the first and second electrodes of each one of the plurality of actuator cells disposed adjacent to the first and second electrodes of another one of the plurality of actuator cells.

3. The electro-hydraulic actuator of claim 1, wherein the plurality of actuator cells are arranged such that the first and second electrodes of each one of the plurality of actuator cells are not adjacent to the first and second electrodes of adjacent ones of the plurality of actuator cells.

4. The electro-hydraulic actuator of claim 1, further comprising:
in at least one of the plurality of actuator cells,
a third electrode at least partially disposed over the first side of the deformable shell, and
a fourth electrode at least partially disposed over the second side of the deformable shell,
wherein, in the at least one of the plurality of actuator cells, a center portion of the deformable shell is uncovered by the first, second, third, and fourth electrodes.

5. An electro-hydraulic actuator, comprising:
a plurality of actuator cells, each actuator cell comprising
a deformable shell that defines an enclosed internal cavity,
a liquid dielectric contained within the enclosed internal cavity,
a first electrode disposed over a first side of the deformable shell, and
a second electrode disposed over a second side of the deformable shell;
wherein a distance between the first and second electrodes decreases from a first reference point on a first reference axis through the enclosed internal cavity to a second reference point on the first reference axis in the absence of a voltage being applied to the first and second electrodes, wherein, upon application of the voltage to the first and second electrodes, electrostatic forces between the first and second electrodes progressively draws the first and second electrodes to drive the liquid dielectric along a zipping front in a first dimension such that the deformable shell deforms along a strain axis in a second dimension, the second dimension being orthogonal to the first dimension, further comprising:

in at least one of the plurality of actuator cells,
    a third electrode at least partially disposed over the first side of the deformable shell, and
    a fourth electrode at least partially disposed over the second side of the deformable shell, wherein, in the at least one of the plurality of actuator cells, a center portion of the deformable shell is uncovered by the first, second, third, and fourth electrodes.

6. The electro-hydraulic actuator of claim 5, wherein the plurality of actuator cells are arranged with the first and second electrodes of each one of the plurality of actuator cells disposed adjacent to the first and second electrodes of another one of the plurality of actuator cells.

7. The electro-hydraulic actuator of claim 5, wherein the plurality of actuator cells are arranged such that the first and second electrodes of each one of the plurality of actuator cells are not adjacent to the first and second electrodes of adjacent ones of the plurality of actuator cells.

\* \* \* \* \*